United States Patent
Baheti et al.

(10) Patent No.: US 9,183,458 B2
(45) Date of Patent: Nov. 10, 2015

(54) PARAMETER SELECTION AND COARSE LOCALIZATION OF INTEREST REGIONS FOR MSER PROCESSING

(71) Applicant: QUALCOMM Incorporated, San Diego, CA (US)

(72) Inventors: Pawan Kumar Baheti, Bangalore (IN); Kishor K. Barman, Bangalore (IN); Dhananjay Ashok Gore, Bangalore (IN); Senthilkumar Sundaram, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 13/796,729

(22) Filed: Mar. 12, 2013

(65) Prior Publication Data
US 2014/0023270 A1    Jan. 23, 2014

Related U.S. Application Data

(60) Provisional application No. 61/673,700, filed on Jul. 19, 2012, provisional application No. 61/674,846, filed on Jul. 23, 2012.

(51) Int. Cl.
*G06K 9/46* (2006.01)
*G06K 9/32* (2006.01)

(52) U.S. Cl.
CPC ............ *G06K 9/4661* (2013.01); *G06K 9/3233* (2013.01); *G06K 9/3258* (2013.01); *G06K 9/4638* (2013.01); *G06K 9/4642* (2013.01); *G06K 2209/01* (2013.01)

(58) Field of Classification Search
CPC . G06K 9/3233; G06K 9/4638; G06K 9/4642; G06K 2209/01; G06K 9/325; G06K 9/3283; G06K 9/6227; G06K 9/6292; G06K 9/2661; G06T 3/608; H04N 5/23222
See application file for complete search history.

(56) References Cited

U.S. PATENT DOCUMENTS

| 3,710,321 A | 1/1973 | Rubenstein |
|---|---|---|
| 4,654,875 A | 3/1987 | Srihari et al. |

(Continued)

FOREIGN PATENT DOCUMENTS

| EP | 1146478 A2 | 10/2001 |
|---|---|---|
| EP | 1840798 A1 | 10/2007 |

(Continued)

OTHER PUBLICATIONS

Chaudhuri B., Ed., "Digital Document Processing—Major Directions and Recent Advances", 2007, Springer-Verlag London Limited, XP002715747, ISBN : 978-1-84628-501-1 pp. 103-106, p. 106, section "5.3.5 Zone Separation and Character Segmentation", paragraph 1.

(Continued)

*Primary Examiner* — Jingge Wu
(74) *Attorney, Agent, or Firm* — Silicon Valley Patent Group LLP

(57) ABSTRACT

An attribute is computed based on pixel intensities in an image of the real world, and thereafter used to identify at least one input for processing the image to identify at least a first maximally stable extremal region (MSER) therein. The at least one input is one of (A) a parameter used in MSER processing or (B) a portion of the image to be subject to MSER processing. The attribute may be a variance of pixel intensities, or computed from a histogram of pixel intensities. The attribute may be used with a look-up table, to identify parameter(s) used in MSER processing. The attribute may be a stroke width of a second MSER of a subsampled version of the image. The attribute may be used in checking whether a portion of the image satisfies a predetermined test, and if so including the portion in a region to be subject to MSER processing.

34 Claims, 12 Drawing Sheets

(56) References Cited

U.S. PATENT DOCUMENTS

| | | | |
|---|---|---|---|
| 5,321,768 A | 6/1994 | Fenrich et al. | |
| 5,459,739 A | 10/1995 | Handley et al. | |
| 5,465,304 A | 11/1995 | Cullen et al. | |
| 5,519,786 A | 5/1996 | Courtney et al. | |
| 5,563,403 A | 10/1996 | Bessho et al. | |
| 5,633,954 A | 5/1997 | Gupta et al. | |
| 5,751,850 A | 5/1998 | Rindtorff | |
| 5,764,799 A | 6/1998 | Hong et al. | |
| 5,768,451 A | 6/1998 | Hisamitsu et al. | |
| 5,805,747 A | 9/1998 | Bradford | |
| 5,835,633 A | 11/1998 | Fujisaki et al. | |
| 5,844,991 A | 12/1998 | Hochberg et al. | |
| 5,978,443 A | 11/1999 | Patel | |
| 6,023,536 A | 2/2000 | Visser | |
| 6,092,045 A | 7/2000 | Stubley et al. | |
| 6,266,439 B1 | 7/2001 | Pollard et al. | |
| 6,393,443 B1 | 5/2002 | Rubin et al. | |
| 6,473,517 B1 | 10/2002 | Tyan et al. | |
| 6,674,919 B1 | 1/2004 | Ma et al. | |
| 6,678,415 B1 | 1/2004 | Popat et al. | |
| 6,687,421 B1 | 2/2004 | Navon | |
| 6,738,512 B1 | 5/2004 | Chen et al. | |
| 6,954,795 B2 | 10/2005 | Takao et al. | |
| 7,110,621 B1 | 9/2006 | Greene et al. | |
| 7,142,727 B2 | 11/2006 | Notovitz et al. | |
| 7,263,223 B2 | 8/2007 | Irwin | |
| 7,333,676 B2 | 2/2008 | Myers et al. | |
| 7,403,661 B2 | 7/2008 | Curry et al. | |
| 7,450,268 B2 | 11/2008 | Martinez et al. | |
| 7,724,957 B2 | 5/2010 | Abdulkader | |
| 7,738,706 B2 | 6/2010 | Aradhye et al. | |
| 7,783,117 B2 | 8/2010 | Liu et al. | |
| 7,817,855 B2 | 10/2010 | Yuille et al. | |
| 7,889,948 B2 | 2/2011 | Steedly et al. | |
| 7,961,948 B2 | 6/2011 | Katsuyama | |
| 7,984,076 B2 | 7/2011 | Kobayashi et al. | |
| 8,009,928 B1 | 8/2011 | Manmatha et al. | |
| 8,189,961 B2 | 5/2012 | Nijemcevic et al. | |
| 8,194,983 B2 | 6/2012 | Al-Omari et al. | |
| 8,285,082 B2 | 10/2012 | Heck | |
| 8,306,325 B2 | 11/2012 | Chang | |
| 8,417,059 B2 | 4/2013 | Yamada | |
| 8,542,926 B2 | 9/2013 | Panjwani et al. | |
| 8,644,646 B2 | 2/2014 | Heck | |
| 2002/0037104 A1 | 3/2002 | Myers et al. | |
| 2003/0026482 A1 | 2/2003 | Dance | |
| 2003/0099395 A1 | 5/2003 | Wang et al. | |
| 2003/0215137 A1 | 11/2003 | Wnek | |
| 2004/0179734 A1 | 9/2004 | Okubo | |
| 2004/0240737 A1 | 12/2004 | Lim et al. | |
| 2005/0041121 A1 | 2/2005 | Steinberg et al. | |
| 2005/0123199 A1 | 6/2005 | Mayzlin et al. | |
| 2005/0238252 A1 | 10/2005 | Prakash et al. | |
| 2006/0039605 A1 | 2/2006 | Koga | |
| 2006/0215231 A1 | 9/2006 | Borrey et al. | |
| 2006/0291692 A1 | 12/2006 | Nakao et al. | |
| 2007/0110322 A1 | 5/2007 | Yuille et al. | |
| 2007/0116360 A1 | 5/2007 | Jung et al. | |
| 2007/0217676 A1 | 9/2007 | Grauman et al. | |
| 2008/0008386 A1 | 1/2008 | Anisimovich et al. | |
| 2008/0063273 A1 | 3/2008 | Shimodaira | |
| 2008/0112614 A1 | 5/2008 | Fluck et al. | |
| 2009/0060335 A1 | 3/2009 | Rodriguez et al. | |
| 2009/0202152 A1 | 8/2009 | Takebe et al. | |
| 2009/0232358 A1* | 9/2009 | Cross | 382/103 |
| 2009/0252437 A1 | 10/2009 | Li et al. | |
| 2009/0316991 A1* | 12/2009 | Geva et al. | 382/176 |
| 2009/0317003 A1 | 12/2009 | Heilper et al. | |
| 2010/0049711 A1 | 2/2010 | Singh et al. | |
| 2010/0067826 A1 | 3/2010 | Honsinger et al. | |
| 2010/0080462 A1 | 4/2010 | Miljanic et al. | |
| 2010/0128131 A1 | 5/2010 | Tenchio et al. | |
| 2010/0141788 A1 | 6/2010 | Hwang et al. | |
| 2010/0144291 A1 | 6/2010 | Stylianou et al. | |
| 2010/0172575 A1 | 7/2010 | Lukac et al. | |
| 2010/0195933 A1 | 8/2010 | Nafarieh | |
| 2010/0232697 A1 | 9/2010 | Mishima et al. | |
| 2010/0239123 A1 | 9/2010 | Funayama et al. | |
| 2010/0245870 A1 | 9/2010 | Shibata | |
| 2010/0272361 A1 | 10/2010 | Khorsheed et al. | |
| 2010/0296729 A1 | 11/2010 | Mossakowski | |
| 2011/0052094 A1 | 3/2011 | Gao et al. | |
| 2011/0081083 A1 | 4/2011 | Lee et al. | |
| 2011/0188756 A1 | 8/2011 | Lee et al. | |
| 2011/0215147 A1* | 9/2011 | Goncalves | 235/383 |
| 2011/0222768 A1 | 9/2011 | Galic et al. | |
| 2011/0249897 A1 | 10/2011 | Chaki et al. | |
| 2011/0274354 A1 | 11/2011 | Nijemcevic | |
| 2011/0280484 A1 | 11/2011 | Ma et al. | |
| 2011/0285873 A1* | 11/2011 | Showering | 348/231.99 |
| 2012/0051642 A1 | 3/2012 | Berrani et al. | |
| 2012/0066213 A1 | 3/2012 | Ohguro | |
| 2012/0092329 A1 | 4/2012 | Koo et al. | |
| 2012/0114245 A1 | 5/2012 | Lakshmanan et al. | |
| 2012/0155754 A1 | 6/2012 | Chen et al. | |
| 2013/0001295 A1 | 1/2013 | Goncalves | |
| 2013/0058575 A1 | 3/2013 | Koo et al. | |
| 2013/0129216 A1* | 5/2013 | Tsai et al. | 382/170 |
| 2013/0194448 A1* | 8/2013 | Baheti et al. | 348/222.1 |
| 2013/0195315 A1* | 8/2013 | Baheti et al. | 382/103 |
| 2013/0195360 A1 | 8/2013 | Krishna Kumar et al. | |
| 2013/0195376 A1 | 8/2013 | Baheti et al. | |
| 2013/0308860 A1* | 11/2013 | Mainali et al. | 382/170 |
| 2014/0003709 A1* | 1/2014 | Ranganathan et al. | 382/159 |
| 2014/0022406 A1 | 1/2014 | Baheti et al. | |
| 2014/0023271 A1 | 1/2014 | Baheti et al. | |
| 2014/0023273 A1 | 1/2014 | Baheti et al. | |
| 2014/0023274 A1 | 1/2014 | Barman et al. | |
| 2014/0023275 A1 | 1/2014 | Krishna Kumar et al. | |
| 2014/0023278 A1 | 1/2014 | Krishna Kumar et al. | |
| 2014/0161365 A1 | 6/2014 | Acharya | |
| 2014/0168478 A1 | 6/2014 | Baheti et al. | |

FOREIGN PATENT DOCUMENTS

| | | |
|---|---|---|
| EP | 2192527 A1 | 6/2010 |
| GB | 2453366 A | 4/2009 |
| GB | 2468589 A | 9/2010 |
| WO | 2004077358 A1 | 9/2004 |

OTHER PUBLICATIONS

Chaudhuri B.B., et al., "An OCR system to read two Indian language scripts: Bangla and Devnagari (Hindi)", Proceedings of the 4th International Conference on Document Analysis and Recognition. (ICDAR). Ulm, Germany, Aug. 18-20, 1997; [Proceedings of the ICDAR], Los Alamitos, IEEE Comp. Soc, US, vol. 2, Aug. 18, 1997, pp. 1011-1015, XP010244882, DOI: 10.1109/ICDAR.1997.620662 ISBN: 978-0-8186-7898-1 the whole document.

Chaudhury S (Eds.): "OCR Technical Report for the project Development of Robust Document Analysis and Recognition System for Printed Indian Scripts", 2008, pp. 149-153, XP002712777, Retrieved from the Internet: URL:http://researchweb.iiit.ac.inj-jinesh/ocrDesignDoc.pdf [retrieved on Sep. 5, 2013].

Chen Y.L., "A knowledge-based approach for textual information extraction from mixed text/graphics complex document images", Systems Man and Cybernetics (SMC), 2010 IEEE International Conference on, IEEE, Piscataway, NJ, USA, Oct. 10, 2010, pp. 3270-3277, XP031806156, ISBN: 978-1-4244-6586-6.

Dalal N., et al., "Histograms of oriented gradients for human detection", Computer Vision and Pattern Recognition, 2005 IEEE Computer Society Conference on, IEEE, Piscataway, NJ, USA, Jun. 25, 2005, pp. 886-893 vol. 1, XP031330347, ISBN: 978-0-7695-2372-9 Section 6.3.

Forssen P.E., et al., "Shape Descriptors for Maximally Stable Extremal Regions", Computer Vision, 2007. ICCV 2007. IEEE 11th International Conference on, IEEE, PI, Oct. 1, 2007, pp. 1-8, XP031194514 , ISBN: 978-1- 4244-1630-1 abstract Section 2. Multi-resoltuion MSER.

International Search Report and Written Opinion—PCT/US2013/049498—ISA/EPO—Oct. 29, 2013.

(56) References Cited

OTHER PUBLICATIONS

Minoru M., Ed., "Character Recognition", Aug. 2010, Sciyo, XP002715748, ISBN: 978-953-307-105-3 pp. 91-95, p. 92, section "7.3 Baseline Detection Process".
Pal U et al., "Multi-skew detection of Indian script documents" Document Analysis and Recognition, 2001. Proceedings. Sixth International Conference on Seattle, WA, USA Sep. 10-13, 2001, Los Aalmitos, CA, USA, IEEE Comput. Soc. US, Sep. 10, 2001, pp. 292-296, XP10560519, DOI.10.1109/ICDAR.2001.953801, ISBN: 978-0-7695-1263-1.
Pal U., et al., "OCR in Bangla: an Indo-Bangladeshi language", Pattern Recognition, 1994. vol. 2—Conference B: Computer Vision & Image Processing., Proceedings of the 12th IAPR International. Conferenc E on Jerusalem, Israel Oct. 9-13, 1994, Los Alamitos, CA, USA, IEEE Comput. Soc. vol. 2, Oct 9, 1994, pp. 269-273, XP010216292, DOI: 10.1109/ICPR.1994.576917 ISBN: 978-0-8186-6270-6 the whole document.
Premaratne H.L., et al., "Lexicon and hidden Markov model-based optimisation of the recognised Sinhala script", Pattern Recognition Letters, Elsevier, Amsterdam, NL, vol. 27, No. 6, Apr. 15, 2006, pp. 696-705, XP027922538, ISSN: 0167-8655.
Ray A.K et al., "Information Technology—Principles and Applications". 2004. Prentice-Hall of India Private Limited. New Delhi! XP002712579, ISBN: 81-203-2184-7, pp. 529-531.
Senda S., et al., "Fast String Searching in a Character Lattice," IEICE Transactions on Information and Systems, Information & Systems Society, Tokyo, JP, vol. E77-D, No. 7, Jul. 1, 1994, pp. 846-851, XP000445299, ISSN: 0916-8532.
Senk V., et al., "A new bidirectional algorithm for decoding trellis codes," Eurocon' 2001, Trends in Communications, International Conference on Jul. 4-7, 2001, Piscataway, NJ, USA, IEEE, Jul. 4, 2001, pp. 34-36, vol. I, XP032155513, DOI :10.1109/EURCON. 2001.937757 ISBN : 978-0-7803-6490-5.
Sinha R.M.K., et al., "On Devanagari document processing", Systems, Man and Cybernetics, 1995. Intelligent Systems for the 21st Century., IEEE International Conference on Vancouver, BC, CANADA Oct. 22-25, 1995, New York, NY, USA,IEEE, US, vol. 2, Oct. 22, 1995, pp. 1621-1626, XP010194509, DOI: 10.1109/ICSMC.1995.538004 ISBN: 978-0-7803-2559-3 the whole document.
Song Y., et al., "A Handwritten Character Extraction Algorithm for Multi-language Document Image", 2011 International Conference on Document Analysis and Recognition, Sep. 18, 2011, pp. 93-98, XP055068675, DOI: 10.1109/ICDAR.2011.28 ISBN: 978-1-45-771350-7.
Uchida S et al., "Skew Estimation by Instances", 2008 the Eighth IAPR International Workshop on Document Analysis Systems, Sep. 1, 2008, pp. 201-208, XP055078375, DOI: 10.1109/DAS.2008.22, ISBN: 978-0-76-953337-7.
Unser M., "Sum and Difference Histograms for Texture Classification", Transactions on Pattern Analysis and Machine Intelligence, IEEE, Piscataway, USA, vol. 30, No. 1, Jan. 1, 1986, pp. 118-125, XP011242912, ISSN: 0162-8828 section A; p. 122, right-hand column p. 123.
Wu V., et al., "TextFinder: An Automatic System to Detect and Recognize Text in Images", IEEE Transactions on Pattern Analysis and Machine Intelligence, vol. 21. No. 11, Nov. 1, 1999, pp. 1224-1229, XP055068381.
"4.1 Points and patches" In: Szeliski Richard: "Computer Vision—Algorithms and Applications", 2011, Springer-Verlag, London, XP002696110, p. 195, ISBN: 978-1-84882-934-3.
Agrawal M., et al., "2 Base Devanagari OCR System" In: Govindaraju V, Srirangataj S (Eds.): "Guide to OCR for Indic Scripts—Document Recognition and Retrieval", 2009, Springer Science+Business Media, London, XP002696109, pp. 184-193, ISBN: 978-1-84888-329-3.
Chowdhury A.R., et al., "Text Detection of Two Major Indian Scripts in Natural Scene Images", Sep. 22, 2011, Camera-Based Document Analysis and Recognition, Springer Berlin Heidelberg, pp. 42-57, XP019175802, ISBN: 978-3-642-29363-4.
Ghoshal R., et al., "Headline Based Text Extraction from Outdoor Images", 4th International Conference on Pattern Recognition and Machine Intelligence, Springer LNCS, vol. 6744, Jun. 27, 2011, pp. 446-451, XP055060285.
Papandreou A. et al., "A Novel Skew Detection Technique Based on Vertical Projections", International Conference on Document Analysis and Recognition, Sep. 18, 2011, pp. 384-388, XP055062043, DOI: 10.1109/ICDAR.2011.85, ISBN: 978-1-45-771350-7.
Setlur, et al., "Creation of data resources and design of an evaluation test bed for Devanagari script recognition", Research Issues in Data Engineering: Multi-lingual Information Management, RIDE-MLIM 2003. Proceedings. 13th International Workshop, 2003, pp. 55-61.
Agrawal, M. et al. "Generalization of Hindi OCR Using Adaptive Segmentation and Font Files," V. Govindaraju, S. Setlur (eds.), Guide to OCR for Indic Scripts, Advances in Pattern Recognition, Springer-Verlag London Limited 2009, pp. 181-207.
Dlagnekov, L. et al. "Detecting and Reading Text in Natural Scenes," Oct. 2004, pp. 1-22.
Elgammal, A.M. et al. "Techniques for Language Identification for Hybrid Arabic-English Document Images," believed to be published in 2001 in Proceedings of IEEE 6th International Conference on Document Analysis and Recognition, pp. 1-5.
Holmstrom, L. et al. "Neural and Statistical Classifiers-13 Taxonomy and Two Case Studies," IEEE Transactions on Neural Networks, Jan. 1997, pp. 5-17, vol. 8 (1).
Jain, A. K. et al. "Automatic Text Location in Images and Video Frames," believed to be published in Proceedings of Fourteenth International Conference on Pattern Recognition, vol. 2, Aug. 1998, pp. 1497-1499.
Machine Learning, retrieved from http://en.wikipedia.org/wiki/Machine_learning, May 7, 2012, pp. 1-8.
Moving Average, retrieved from http://en.wikipedia.org/wiki/Moving_average, Jan. 23, 2013, pp. 1-5.
Pardo, M. et al. "Learning From Data: A Tutorial With Emphasis on Modern Pattern Recognition Methods," IEEE Sensors Journal, Jun. 2002, pp. 203-217, vol. 2 (3).
Renold, M. "Detecting and Reading Text in Natural Scenes," Master's Thesis, May 2008, pp. 1-59.
Vedaldi, A. "An Implementation of Multi-Dimensional Maximally Stable Extremal Regions", Feb. 7, 2007, pp. 1-7.
VLFeat—Tutorials—MSER, retrieved from http://www.vlfeat.org/overview/mser.html, Apr. 30, 2012, pp. 1-2.
Chaudhuri et al. "Skew Angle Detection of Digitized Indian Script Documents", IEEE Transactions on Pattern Analysis and Machine Intelligence, Feb. 1997, pp. 182-186, vol. 19, No. 2.
Chen, et al. "Detecting and reading text in natural scenes," IEEE Computer Society Conference on Computer Vision and Pattern Recognition (CVPR'04), 2004, pp. 1-8.
Epshtein et al. "Detecting text in natural scenes with stroke width transform," Computer Vision and Pattern Recognition (CVPR) 2010, pp. 2963-2970, (as downloaded from "http://research.microsoft.com/pubs/149305/1509.pdf").
Jain, et al. "Automatic text location in images and video frames", Pattern Recognition, 1998, pp. 2055-2076, vol. 31, No. 12.
Jayadevan, et al., "Offline Recognition of Devanagari Script: A Survey", IEEE Transactions on Systems, Man, and Cybernetics—Part C: Applications and Reviews, 2010, pp. 1-15.
Kapoor et al. "Skew angle detection of a cursive handwritten Devanagari script character image", Indian Institute of Science, May-Aug. 2002, pp. 161-175.
Lee, et al. "A new methodology for gray-scale character segmentation and recognition," IEEE Transactions on Pattern Analysis and Machine Intelligence, Oct. 1996, pp. 1045-1050, vol. 18, No. 10.
Li et al. "Automatic Text Detection and Tracking in a Digital Video", IEEE Transactions on Image Processing, Jan. 2000, pp. 147-156, vol. 9 No. 1.
Matas, et al. "Robust Wide Baseline Stereo from Maximally Stable Extremal Regions", Proc. of British Machine Vision Conference, 2002, pp. 384-393.
Mikulik, et al. "Construction of Precise Local Affine Frames," Center for Machine Perception, Czech Technical University in Prague, Czech Republic, Abstract and second paragraph of Section 1; Algo-

(56) References Cited

OTHER PUBLICATIONS rithms 1 & 2 of Section 2 and Section 4, International Conference on Pattern Recognition, 2010, pp. 1-5.
Pal, et al. "Indian script character recognition: a survey", Pattern Recognition Society, Published by Elsevier Ltd, 2004, pp. 1887-1899.
Chen et al. "Robust Text Detection in Natural Images With Edge-Enhanced Maximally Stable Extremal Regions", believed to be published in IEEE International Conference on Image Processing (ICIP), Sep. 2011, pp. 1-4.
Nister, et al. "Linear Time Maximally Stable Extremal Regions", ECCV, 2008, Part II, LNCS 5303, pp. 183-196, published by Springer-Verlag Berlin Heidelberg.
Shin et al. "Application of Floyd-Warshall Labelling Technique: Identification of Connected Pixel Components in Binary Image", published in Kangweon-Kyungki Math. Jour. 14 (2006), No. 1, pp. 47-55.
Park et al. "Fast Connected Component Labeling Algorithm Using a Divide and Conquer Technique", believed to be published in Matrix (2000), vol. 4, Issue: 1, Publisher: Elsevier Ltd, pp. 4-7.
Lowe, D.G., "Distinctive Image Features from Scale-Invariant Keypoints," International Journal of Computer Vision, Jan. 5, 2004, 28 pp.
Newell, A.J., et al.,"Multiscale histogram of oriented gradient descriptors for robust character recognition", 2011 International Conference on Document Analysis and Recognition (ICDAR), IEEE, 2011, 5 pp.
Wikipedia, "Connected-Component Labeling,", retrieved from http://en.wikipedia.org/wiki/Connected-component_labeling on May 14, 2012, date believed to be prior to Mar. 12, 2013, 7 pages.
Wikipedia, "Histogram of Oriented Gradients," retrieved from http://en.wikipedia.org/wiki/Histogram_of_oriented_gradients on Apr. 30, 2015, date believed to be prior to Mar. 12, 2013, 7 pages.
Kristensen, F., et al., "Real-Time Extraction of Maximally Stable Extremal Regions on an FPGA," IEEE International Symposium on Circuits and Systems 2007 (ISCAS 2007), New Orleans, LA, May 27-30, 2007, pp. 165-168.

\* cited by examiner

PARAMETER SELECTION AND COARSE LOCALIZATION OF INTEREST REGIONS FOR MSER PROCESSING

CROSS-REFERENCE TO US PROVISIONAL APPLICATIONS

This application claims priority under 35 USC §119 (e) from U.S. Provisional Application No. 61/673,700 filed on Jul. 19, 2012 and entitled "Parameter Selection and Coarse Localization of Interest Regions for MSER Processing" which is incorporated herein by reference in its entirety.

This application claims priority under 35 USC §119 (e) from U.S. Provisional Application No. 61/674,846 filed on Jul. 23, 2012 and entitled "Identifying A Maximally Stable Extremal Region (MSER) In An Image By Skipping Comparison Of Pixels In The Region" which is incorporated herein by reference in its entirety.

CROSS-REFERENCE TO US NON-PROVISIONAL APPLICATION

This application is related to commonly-owned and concurrently filed U.S. application Ser. No. 13/797,433, entitled "Identifying A Maximally Stable Extremal Region (MSER) In An Image By Skipping Comparison Of Pixels In The Region" which is incorporated herein by reference in its entirety.

FIELD

This patent application relates to apparatuses and methods that process an image from a camera of a handheld device, to identify symbols therein.

BACKGROUND

Handheld devices such as a cell phone 108 (FIG. 1A) include a digital camera for use by a person 110 with their hands to capture an image of a real world scene 100, such as image 107, shown displayed on a screen 106 of the cell phone 108 in FIG. 1. Image 107 is also referred to as a handheld camera captured image, or a natural image or a real world image, to distinguish it from an image formed by an optical scanner from a document that is printed on paper (e.g. scanned by a flatbed scanner of a photocopier).

Recognition of text in handheld camera captured image 107 (FIG. 1A) may be based on regions (also called "blobs") with boundaries that differ significantly from surrounding pixels in one or more properties, such as intensity and/or color. Some prior art methods first identify a pixel of local minima or maxima (also called "extrema") of a property (such as intensity) in the image (as per act 112 in FIG. 1B), followed by identifying pixels that are located around the identified extrema pixel, within a predetermined range of values of the property, so as to identify a region (as per act 113 in FIG. 1B), known in the prior art as maximally stable extremal region or MSER.

MSERs are regions that are geometrically contiguous (and one can go from one pixel to any other pixel by traversing neighbors) with monotonic transformation in property values, and invariant to affine transformations (transformations that preserve straight lines and ratios of distances between points on the straight lines). Boundaries of MSERs may be used in the prior art as connected components (see act 114 in FIG. 1B), to identify candidates for recognition as text. Connected components may be subject to on one or more geometric tests, to identify a rectangular portion 103 (FIG. 1A) in such a region that is then sliced or segmented into a number of blocks, with each block being a candidate to be recognized, as a character of text. Such a candidate block may be recognized using optical character recognition (OCR) methods.

One such method is described in, for example, an article entitled "Robust Text Detection In Natural Images With Edge-Enhanced Maximally Stable Extremal Regions" by Chen et al, believed to be published in IEEE International Conference on Image Processing (ICIP), September 2011 that is incorporated by reference herein in its entirety as background. MSERs are believed to have been first described by Matas et al., e.g. in an article entitled "Robust Wide Baseline Stereo from Maximally Stable Extremal Regions", Proc. Of British Machine Vision Conference, 2002, pages 384-393 that is incorporated by reference herein in its entirety. The method described by Matas et al. is known to be computationally expensive because the time taken to identify MSERs in an image. The time taken to identify MSERs in an image can be reduced by use of a method of the type described by Nister, et al., "Linear Time Maximally Stable Extremal Regions", ECCV, 2008, Part II, LNCS 5303, pp 183-196, published by Springer-Verlag Berlin Heidelberg that is also incorporated by reference herein in its entirety.

The current inventors note that prior art methods of the type described by Chen et al. or by Matas et al. or by Nister et al. identify hundreds of MSERs, and sometimes identify thousands of MSERs in an image 107 (FIG. 1A) that includes details of natural features, such as leaves of a tree or leaves of plants, shrubs, and bushes. For example, numerous MSERs may be generated from one version of an image (also called MSER+ image) by use of a method of the type described above on natural image 107. Also, another image (also called MSER− image), may be similarly generated by use of the just-described method, after inverting intensity values of pixels in image 107, to obtain numerous additional MSERs.

OCR methods of the prior art originate in the field of document processing, wherein the document image contains a series of lines of text oriented parallel to one another (e.g. 20 lines of text on a page). Such OCR methods extract a vector (called "feature vector") from binary values in each block and this vector that is then compared with a library of reference vectors generated ahead of time (based on training images of letters of an alphabet to be recognized). Next, a letter of the alphabet which is represented by a reference vector in the library that most closely matches the vector of the block is identified as recognized, to conclude OCR ("document" OCR).

The current inventors believe that MSER processing of the type described above, to detect a connected component for use in OCR, requires memory and processing power that is not normally available in today's handheld devices, such as a smart phone. Hence, there appears to be a need for methods and apparatuses to speed up MSER processing, of the type described below.

SUMMARY

In several embodiments, intensities of pixels in an image of a scene in the real world are used to compute an attribute of a histogram of intensities, as a function of number of pixels at each intensity level. Hence, a histogram attribute may be used in automatic selection from the image, of one or more regions (in a process referred to as coarse localization), on which processing is to be performed to identify maximally stable extremal regions (MSERs) that are to be subject to OCR. An example of such an attribute is bimodality (more specifically, presence of two peaks distinct from one another) in the histogram, detection of which results in selection of the region for MSER processing.

Another such histogram attribute may be used in automatic selection of one or more parameters used in MSER processing, e.g. parameters Δ and Max Variation. A first example of such a histogram attribute ("support") is the number of bins of the histogram in which corresponding counts of pixels exceed a threshold. In some embodiments, the just-described support attribute is varied (1) inversely with MSER parameter Δ and (2) directly with MSER parameter Max Variation. A second example attribute is variance, in the histogram of pixel intensities, which is also varied (1) inversely with MSER parameter Δ and (2) directly with MSER parameter Max Variation. A third example attribute is area above mean, in the histogram of pixel intensities, which is made to vary: (1) directly with MSER parameter Δ and (2) inversely with MSER parameter Max Variation.

Some embodiments make both uses of histogram attributes as described above, specifically by using one or more attributes to select a region for MSER processing, and also using one or more attributes to select the MSER parameters Δ and Max Variation. However, other embodiments make only a single use of such a histogram attribute, as described next. Certain embodiments use an attribute of the type described above to select a region for MSER processing, and parameters Δ and Max Variation are selected using any method. In other embodiments, a region for MSER processing is selected by any method, followed by using an attribute of the type described above to select MSER parameters Δ and Max Variation.

Accordingly, it is to be understood that several other aspects of the described embodiments will become readily apparent to those skilled in the art from the description herein, wherein it is shown and described various aspects by way of illustration. The drawings and detailed description are to be regarded as illustrative in nature and not as restrictive.

DETAILED DESCRIPTION

Figure 1A:
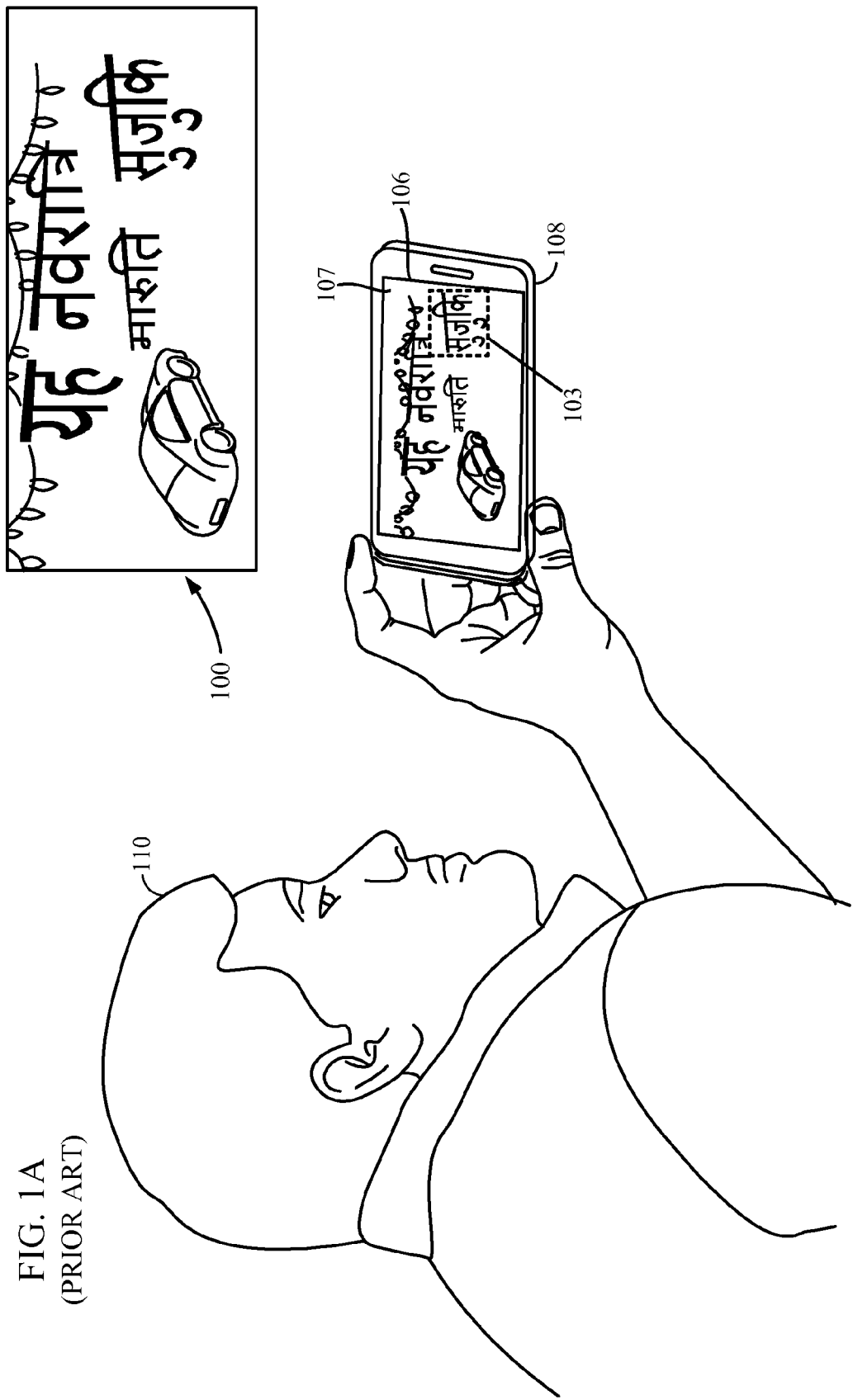
FIG. 1A illustrates a user using a camera-equipped mobile device of the prior art to capture an image of a bill-board in the real world.
Figure 1B:
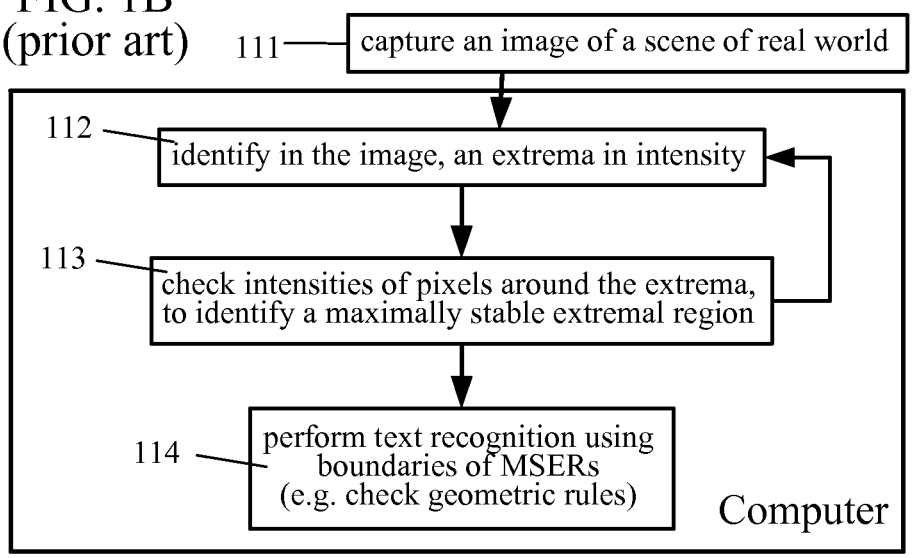
FIG. 1B illustrates, in a high-level flow chart, acts 112-114 by a prior art computer in using an image from a camera operated in act 111, as illustrated in FIG. 1A.

In several aspects of the described embodiments, an image (also called "handheld camera captured image") of a scene of a real world (e.g. see FIG. 1) is received in an act 201 (FIG. 2) performed by one or more processors 404 (FIG. 6) executing first instructions, e.g. from a camera 405 of a mobile device 401. Next, in act 211A, the one or more processors 404 execute second instructions by using the received image to compute an attribute based on pixel intensities, e.g. bimodality of a histogram of pixel intensities in the image or of a portion therein (e.g. if the image is subdivided into a number of blocks, as per act 202). Next, as per act 212A, the one or more processors 404 execute third instructions to identify an input for MSER processing, e.g. use the histogram attribute to determine whether or not the image portion (or block) satisfies a test for the image portion (or block) to be selected for MSER processing. Specifically, in some embodiments, when the number of peaks in the histogram is at least two, the image portion (or block) is marked as selected in one or more memories 214.

Next, in act 215, one or more processors 404 execute fourth instructions to perform MSER processing, e.g. using at least one portion (or block) that has been selected in act 212A. The MSER processing by execution of the fourth instructions may use a look-up table in memory 329 to obtain one or more input parameters in addition to the input identified by execution of the third instructions. The look-up table used in the fourth instructions may supply one or more specific combinations of values for the parameters Δ and Max Variation, which are input to an MSER method (also called MSER input parameters). Such a look-up table may be populated ahead of time, with specific values for Δ and Max Variation, e.g. determined by experimentation to generate contours that are appropriate for recognition of text in a natural image (e.g. image 501), such as value 8 for Δ and value 0.07 for Max Variation. Depending on the embodiment, the look-up table may be looked up using as an index, any attribute (of the type described herein), e.g. computed based on pixel intensities.

In some embodiments, the MSER processing in act 215 performed by execution of the fourth instructions includes comparing a difference in intensities of a pair of pixels in image 501 to a predetermined limit, followed by execution of fifth instructions to add to a list in memory 329 (FIG. 6), a pair of coordinates a pixel in the pair of pixels, in response to finding that the limit is exceeded. Specifically, in certain embodiments of the fifth instructions, pixels are identified in a set of positions (which may be implemented as a list) that in turn identifies pixels in a region $Q_i$ which includes a local extrema of intensity (such as local maxima or local minima) in image 501.

Such a region $Q_i$ may be identified by execution of fifth instructions in act 215 (FIG. 2A) as being maximally stable relative to one or more intensities in a range $i-\Delta$ to $i+\Delta$ (depending on the embodiment, including the above-described intensity i), each intensity i being used as a threshold (with Δ being a parameter input to an MSER method) in comparisons with intensities of a plurality of pixels included in region $Q_i$ to identify respective regions $Q_{i-\Delta}$ and $Q_{i+\Delta}$. In some embodiments, a number of pixels in the region $Q_i$ remains within a predetermined (e.g. user specified) range relative to changes in intensity i across a range $i-\Delta$ to $i+\Delta$, with a local minima in a ratio $[Q_{i-\Delta}-Q_{i+\Delta}]/Q_i$ occurring at the intensity i. Therefore, the just-described set of positions in certain embodiments are indicative of (or identify) a region $Q_i$ that constitutes an MSER (i.e. a maximally stable extremal region).

Regions may be identified in act 215 by use of a method of the type described in the article entitled "Robust Wide Baseline Stereo from Maximally Stable Extremal Regions" by Matas et al. incorporated by reference above. Alternatively other methods can be used to perform connected component analysis and identification of regions in act 215 e.g. methods of the type described in an article entitled "Application of Floyd-Warshall Labelling Technique Identification of Connected Pixel Components In Binary Image" by Hyunkyung Shin and Joong Sang Shin, published in Kangweon-Kyungki Math. Jour. 14 (2006), No. 1, pp. 47-55 that is incorporated by reference herein in its entirety, or as described in an article entitled "Fast Connected Component Labeling Algorithm Using A Divide and Conquer Technique" by Jung-Me Park, Carl G. Looney and Hui-Chuan Chen, believed to be published in Matrix (2000), Volume: 4, Issue: 1, Publisher: Elsevier Ltd, pages 4-7 that is also incorporated by reference herein in its entirety.

Hence, a specific manner in which regions of an image 501 are identified in act 215 by mobile device 401 in described embodiments can be different, depending on the embodiment. As noted above, in several embodiments, each region of image 501 that is identified by use of an MSER method of the type described above is represented in memory 329 by act 215 in the form of a list of pixels, with two coordinates for each pixel, namely the x-coordinate and the y-coordinate in two dimensional space (of the image). The list of pixels is stored by act 215 in one or more memories, as a representation of a region $Q_i$ which is a maximally stable extremal region (MSER).

Figure 6:
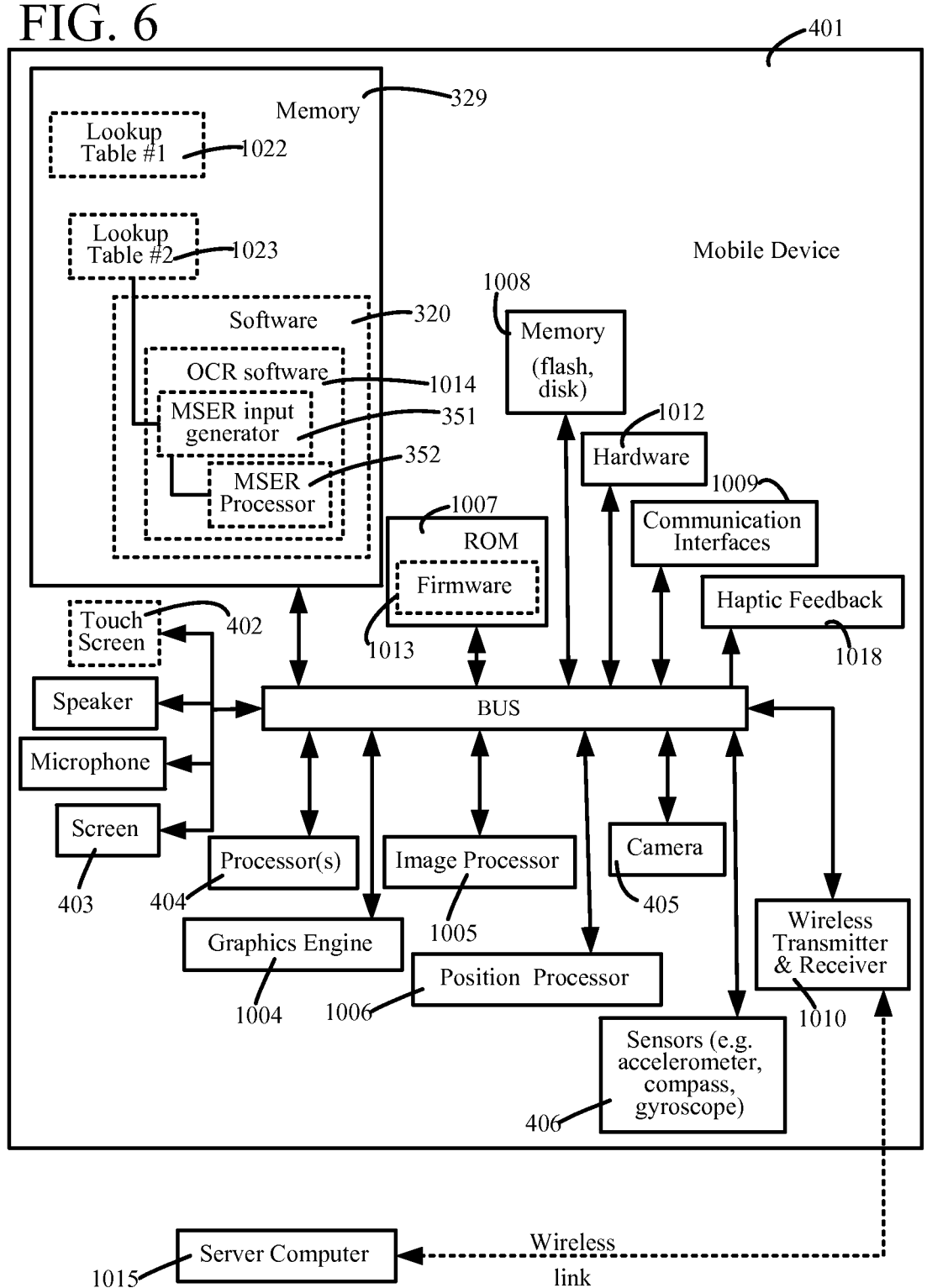
FIG. 6 illustrates, in a high-level block diagram, various components of a handheld device in some of the described embodiments.

Act 215 is performed, in some embodiments, by one or more MSER processor(s) 352 (FIG. 6). MSER processor(s) 352 may be implemented in any manner known in the art. For example, such a MSER processor may identify, using each of several thresholds, corresponding connected components, followed by computation of an area A(i) of connected components at each threshold i, and analyze this function A(i) for stability, to identify a threshold (and hence its connected components) at which a value of the function A(i) does not change significantly over multiple values of threshold i.

In act 217, the one or more processors check if a plurality of portions of the entire image have been processed (evaluated for MSER processing), and if not return to act 212A (described above). If the entire image has been processed, then act 218 is performed by the one or more processors 404 to analyze the MSERs to identify one or more symbols in the image, e.g. by comparing with a library of symbols. For example, a binarized version of such an MSER is used in several described embodiments, as a connected component that is input to optical character recognition (OCR). Next, whichever one or more symbols are found in act 218 to be the closest match(es) is/are marked in one or more memories as being identified in the image, followed by returning to act 201. Specifically, in some embodiments, a predetermined number (e.g. 3) of symbols that are found to be closest to the input of OCR are identified by OCR, as alternatives to one another, while other embodiments of OCR identify a single symbol that is found to be closest to the OCR input.

In some embodiments, a histogram attribute computed in act 211B is used in act 212B (FIG. 2B) to look up a lookup table 1023 (FIG. 6) that provides one or more input parameters 213 that are used in MSER processing, such as either or both of Δ and Max Variation. Thereafter, one or more image portions are subject to MSER processing in act 215, using the input parameters 213. Depending on the embodiment, acts 211B and 212B (FIG. 2B) described above may be performed in an MSER input generator 351 (FIG. 6), which may be implemented in any combination of hardware and software (including a plurality of instructions).

Figure 3A:
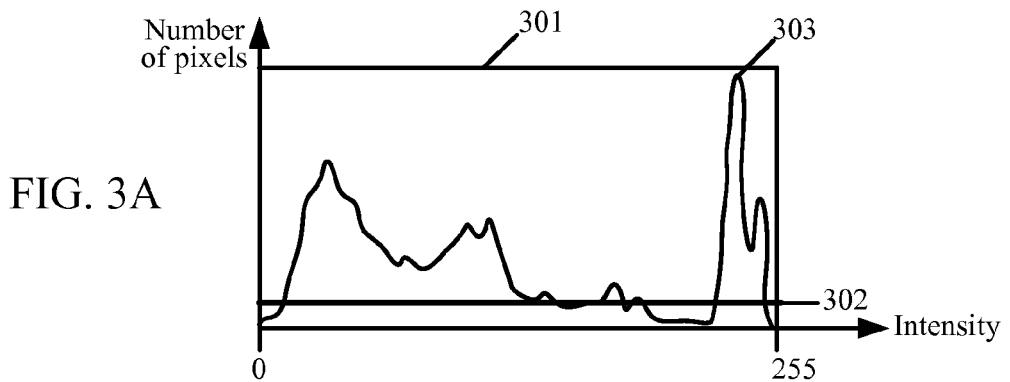
FIGS. 3A and 3B illustrate two histograms of a portion of an image, before and after cropping a region below threshold 302, in some embodiments of act 211A of FIG. 2A.

One illustration of a histogram attribute that is computed in act 211B (described above) is shown in FIG. 3B, as support 309 at a threshold 302 (FIG. 3A) in a histogram 301 of pixel intensities (which may be N in number, e.g. N=256). Histogram 301 shows along the y-axis a sequence of counts of the number of image pixels at each possible brightness level, sorted by brightness level, e.g. from 0-255 along the x-axis. A peak 303 in the histogram 301 indicates presence of a large number of pixels at a specific brightness level (at which the peak 303 occurs). Accordingly, in certain embodiments, the attribute is based on a plurality of bins in the histogram with corresponding counts of pixels above a threshold. In some embodiments, a histogram 301 is computed in hardware, e.g. in an integrated circuit (IC) chip that performs front end processing, to generate several statistics, such as mean of pixel intensities, and area of the histogram. In certain embodiments, the attribute is an area of the histogram above a mean of counts of pixels in the bins of the histogram.

Threshold 302 is identified in a predetermined manner, e.g. set to a fixed percent (or fraction), such as 10% of the maximum count or peak 303 among the N bins of histogram 301. For example, if the maximum count or peak 303 is 80, then the threshold 302 has a value of 8 and therefore support 309 is determined as the number of bins S (from among the N bins) of histogram 301 which have corresponding counts of pixels exceeding the value 8 (of threshold 302). Some embodiments of processor(s) 404 crop the histogram by executing seventh instructions, using threshold 302 in order to determine the support 309.

Support 309 in the form of the number of bins S as described in the preceding paragraph is an attribute that may be used in act 212B (described above) with a lookup table 1023 (FIG. 6) by executing sixth instructions, to obtain values for Δ and Max Variation, which constitute inputs (A) in the form of input parameters 213 that are input to MSER processing (also called MSER input parameters). Hence, some embodiments use two MSER input parameters and the lookup table 1023 (FIG. 6) supplies two values when looked up with support as input (which may be the only input in such embodiments, although other embodiments may use additional attributes as additional inputs to the lookup table 1023). Other embodiments of MSER processing may use just one MSER input parameter in executing sixth instructions, e.g. use just Δ in which case the lookup table 1023 yields just one value for this single MSER input parameter.

Figure 2A:
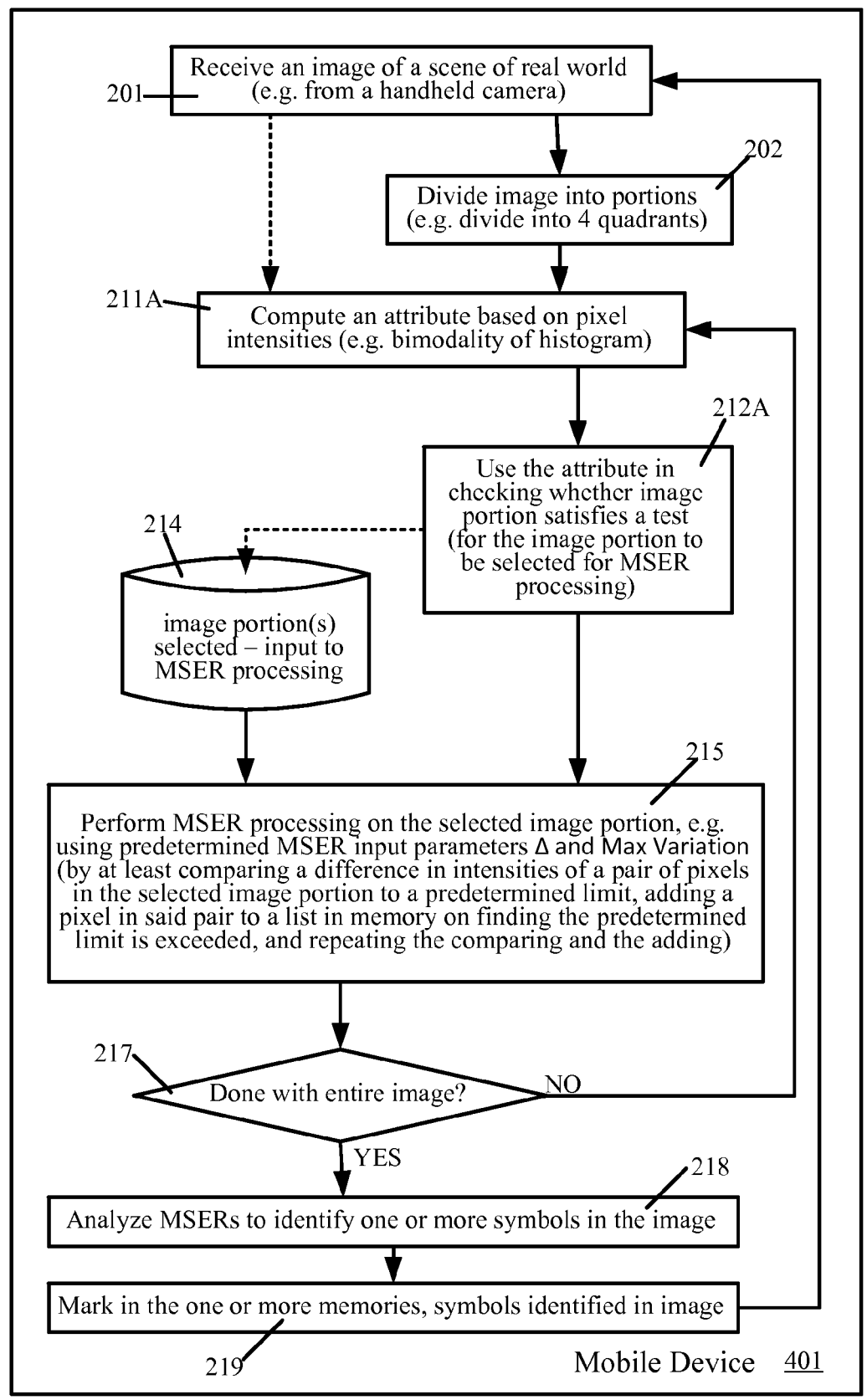
FIGS. 2A-2D illustrate, in flow charts, operations performed by one or more processor(s) 404 in a mobile device 401 in certain described embodiments.
Figure 2B:
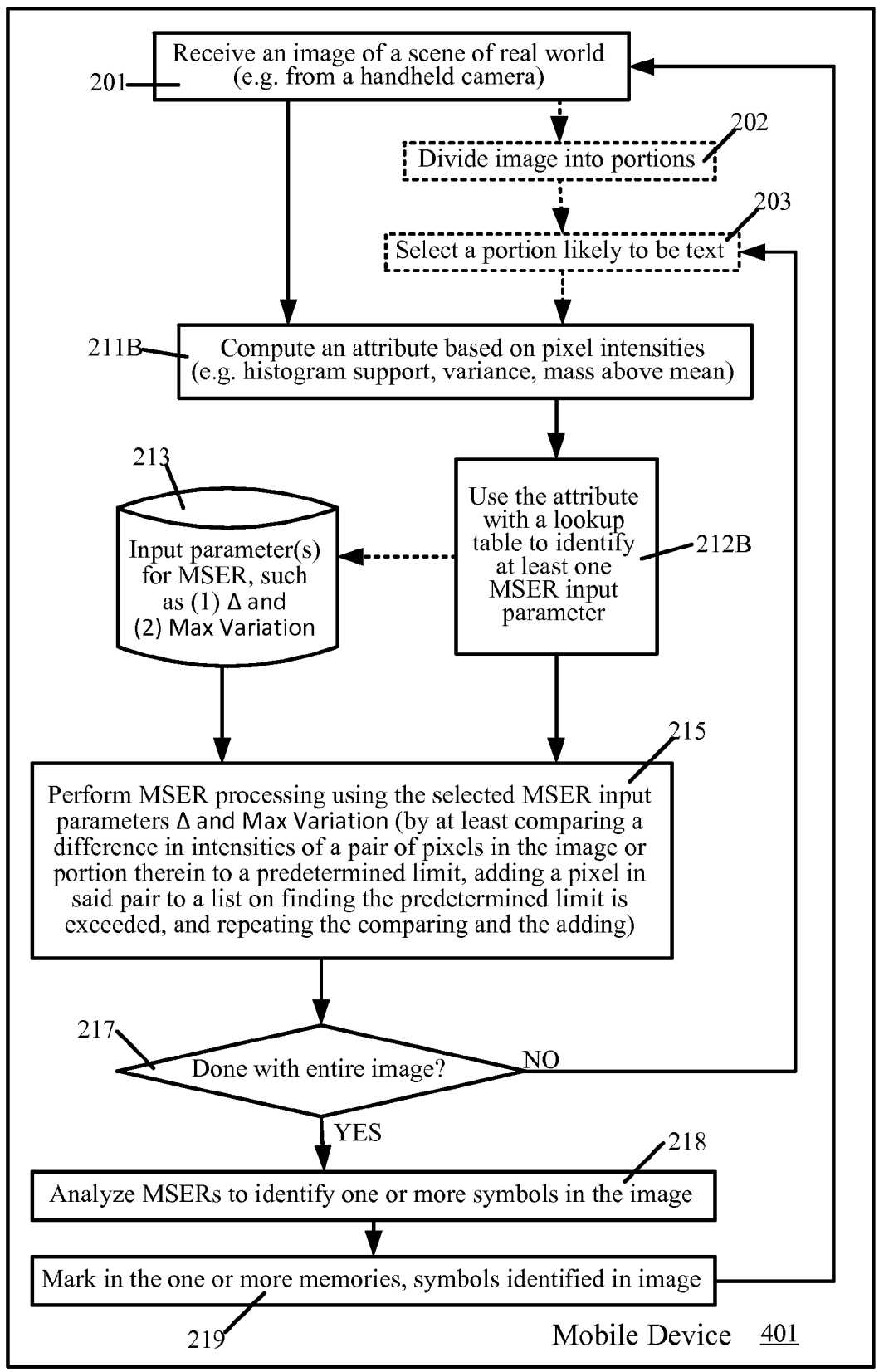
Figure 2C:
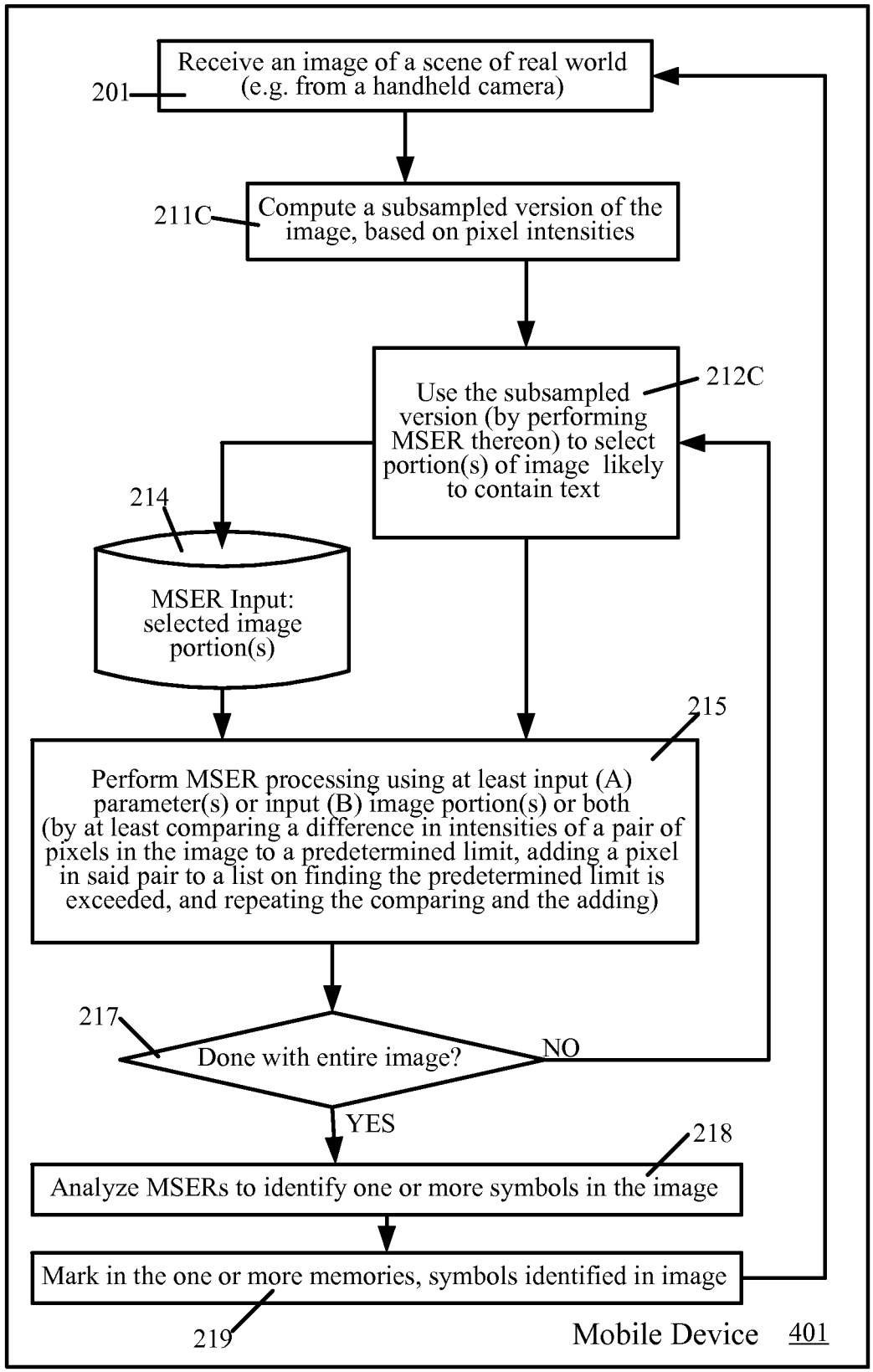
Figure 2D:
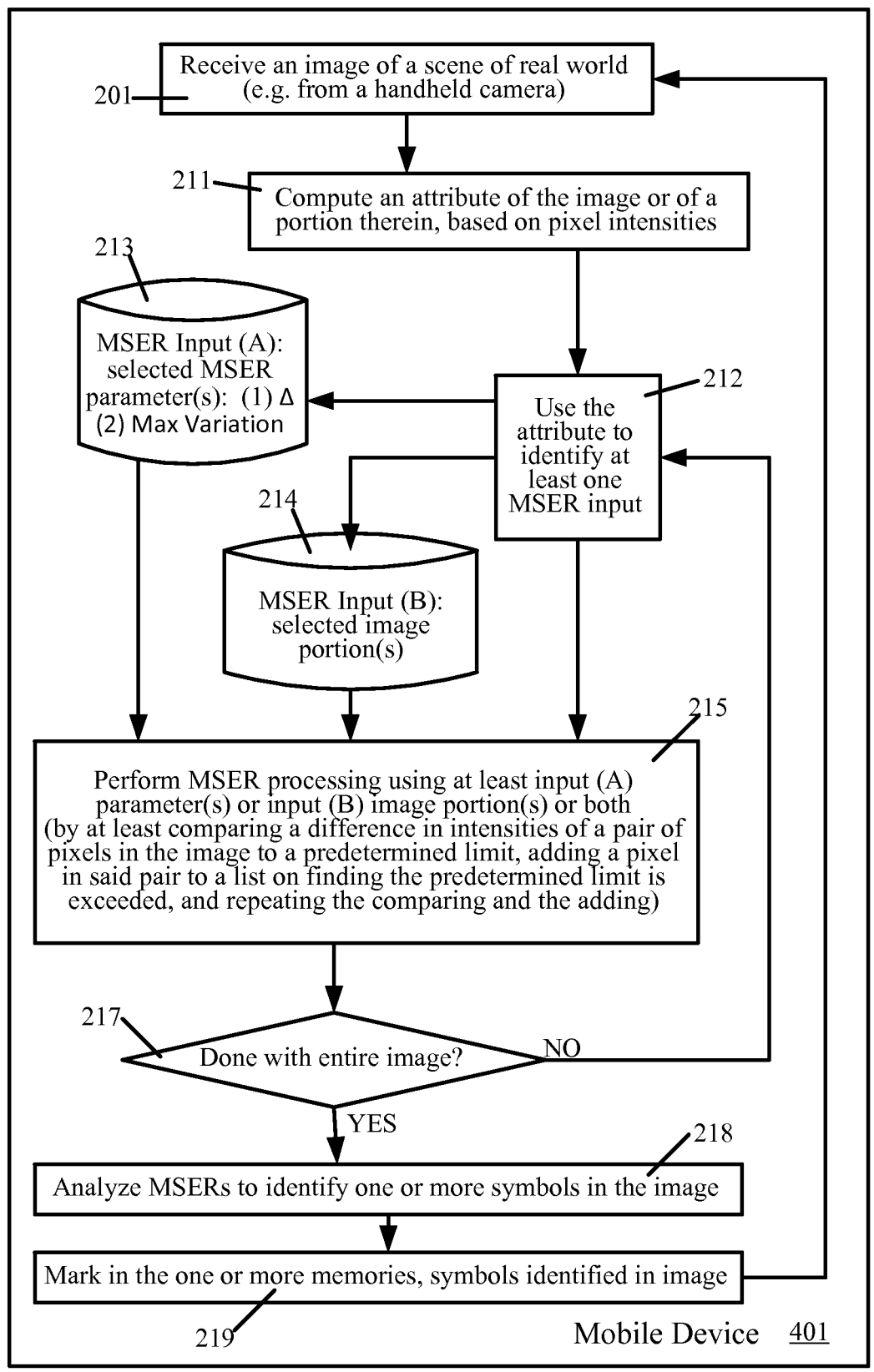
Figure 7:
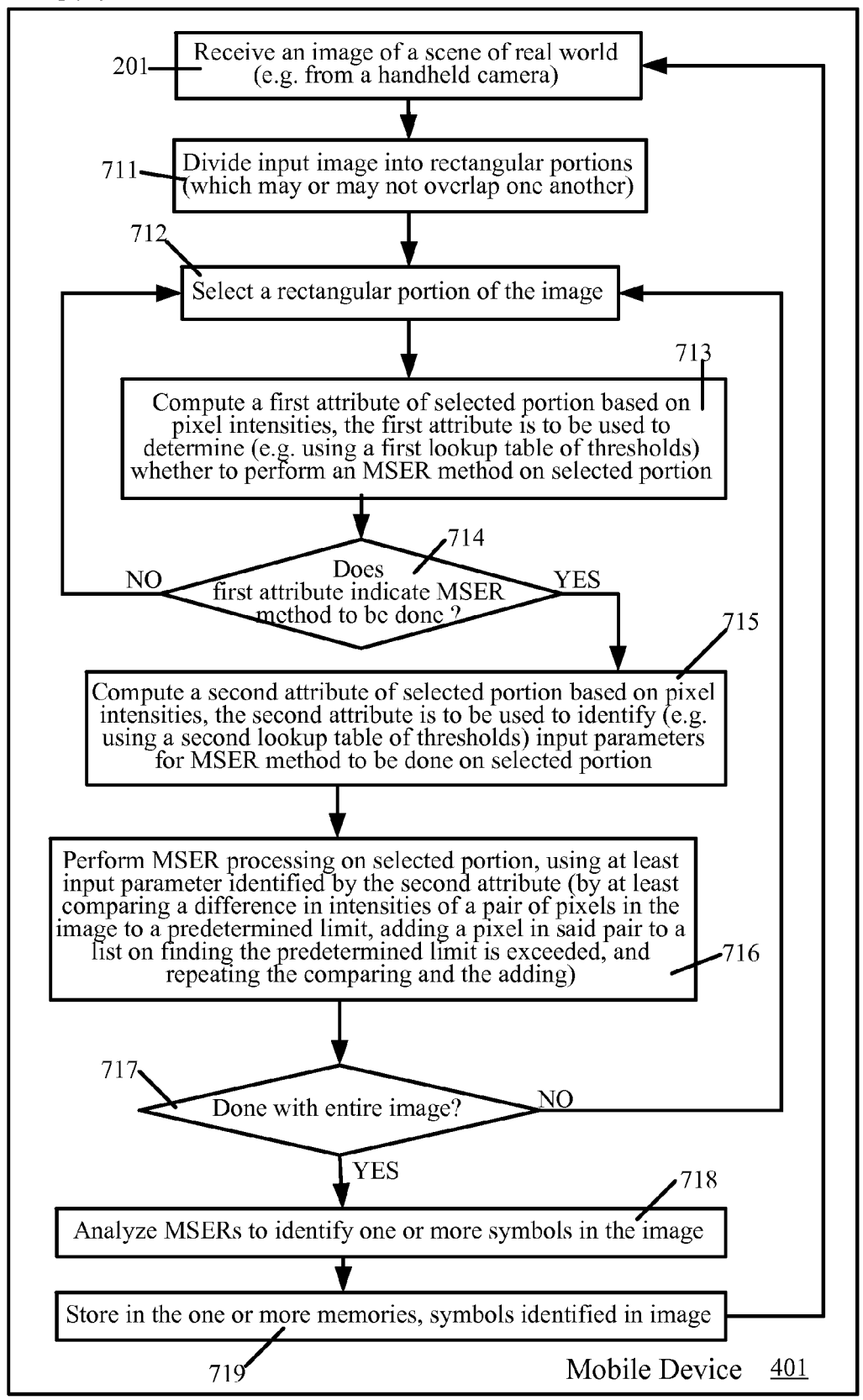
FIG. 7 illustrates, in a flow chart, operations performed by one or more processor(s) 404 in a mobile device 401 in some described embodiments.

Some embodiments described above perform the method of FIG. 2A, while other embodiments perform the method of FIG. 2B, while still other embodiments perform the method of FIG. 2C. Note that depending on the embodiment one or more of these methods may be combined with one another. Hence, these methods are illustrated in FIG. 2D wherein act 212 illustrates performance of any of acts 212A, 212B and 212C. Hence, act 212 executes sixth instructions of some embodiments, to use a histogram attribute to identify at least one input to be used in processing the image, to identify at least one MSER, wherein the at least one input is one of (A) a parameter used in said processing or (B) a portion of the image to be subject to said processing or both (A) and (B). However, certain embodiments perform a combination of the methods of FIGS. 2A and 2B, specifically by performing each of act 212A and act 212B, as illustrated in FIG. 7 (described below).

Figure 3B:
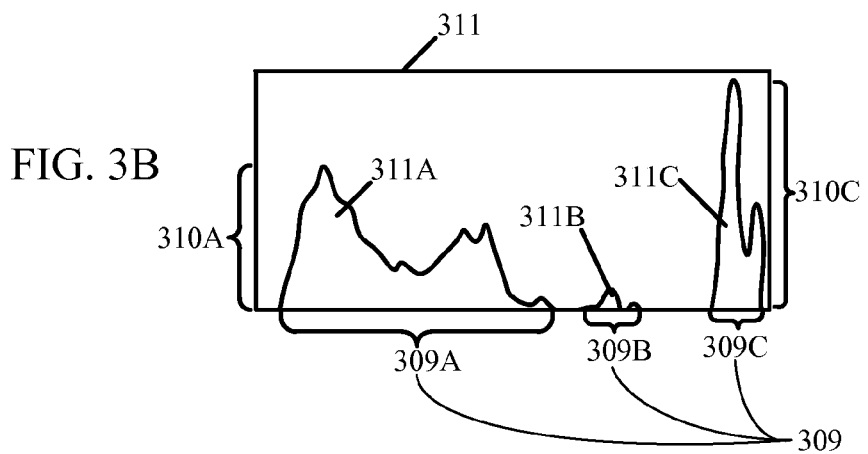

Support 309 in FIG. 3B is the sum of three components 309A, 309B and 309C which in turn form supports of three areas 311A, 311B and 311C of histogram 311 (in turn obtained by thresholding the histogram 301). In some embodiments, a height 310C (FIG. 3B) of area 311C is divided by the support (or width) 309C of area 311C to obtain a ratio (which is an inverse aspect ratio) that is used with a predetermined threshold to recognize presence of a peak. For example, when the just-described ratio of height to width of an area of the histogram is greater than a predetermined multiple, e.g. 2, one or more processors 404 determine that a peak is present in the histogram.

Support 309 may be used in a predetermined test of some embodiments, to determine whether a corresponding image portion (from which histogram 301 was extracted) should be selected for MSER processing, as per act 212A in FIG. 2A. For example, such embodiments may check if support 309 determined by act 211B (FIG. 2B) is greater than a fixed threshold, e.g. S>30, and if true then that image portion is marked (in one or more memories 214) as being selected for MSER processing. The just-described image portion is then subject to MSER processing in act 215 (described above), either alone by itself or in combination with one or more other such portions that may be included in a rectangular region e.g. on execution of eighth instructions by processor(s) 404.

Figure 4:
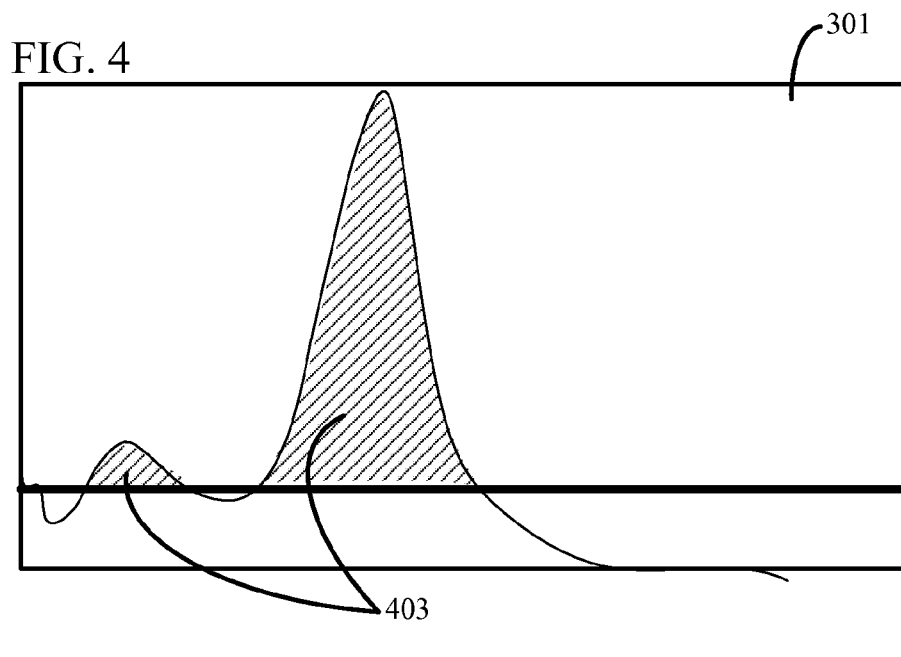
FIG. 4 illustrates in a histogram of a portion of another image, an area above a mean 402 that is computed in some embodiments of act 211B of FIG. 2B.

Another illustration of such an attribute that is computed in act 211 and used in act 212B (FIG. 2B) is shown in histogram 301 of FIG. 4, as an area above mean. Specifically, a mean 402 (FIG. 4) of the number of counts in each of the N bins of histogram 301 is first computed, and then an area 403 above mean 402 is determined. Area 403 is shown hatched in FIG. 4. Depending on the embodiment, the just-described area above mean may be normalized, e.g. by dividing it with total area of histogram 301 to obtain the attribute for use in act 212B, to perform a lookup of the lookup table 1023 to obtain values for Δ and Max Variation.

Another such attribute computed in some embodiments of act 211B (FIG. 2B) is variance of pixel intensities. Specifically, a mean of intensities of all pixels is first computed, and then subtracted from the intensity of each pixel and the difference is squared and summed up with corresponding results for other pixels, and the square root of the sum is used as an attribute in act 212B.

Figure 5A:
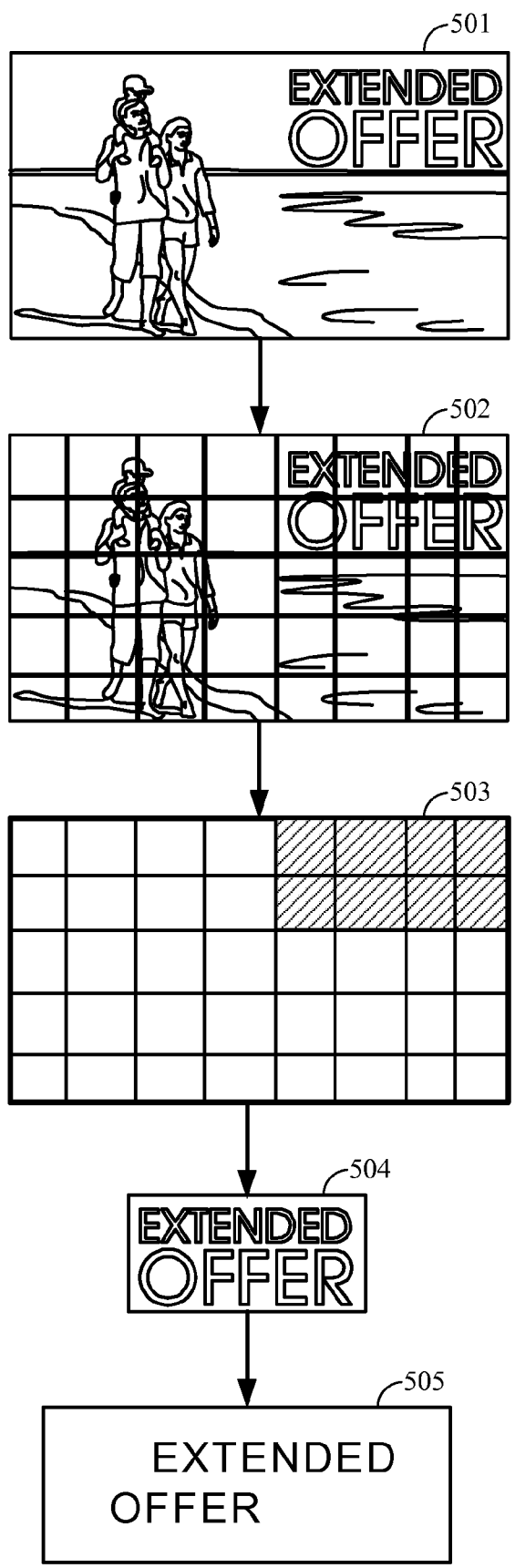
FIGS. 5A and 5B illustrate, in alternative embodiments, cropping of an image to identify an image portion as per act 212 of FIG. 2C.

Several embodiments of the type described above in reference to FIG. 2A, perform coarse localization in act 212A to select one or more image portions that are to be subject to MSER processing as shown by an example in FIG. 5A. Specifically, an image 501 is segmented using a grid 502 and histograms (as described above) are calculated for each segment generated by use of the grid. Next, the intensity histogram of each segment is used to determine one or more of the above-described attributes which is/are then used with one or more predetermined tests (e.g. compared to thresholds) to determine whether or not the segment is to be selected for MSER processing. In the example shown in FIG. 5A, eight segments (e.g. together labeled as segments 503 in FIG. 5A) in the top-right corner have been identified for passing such tests. Hence, such an embodiment crops out from the image 501, a portion 504 which fits within the smallest rectangle that can hold all eight segments, and it is this image portion that is then subject to MSER processing. The results of MSER processing are eventually analyzed, to recognize symbols (as per act 218 in FIG. 2A), resulting in letters 505 (FIG. 5A).

Figure 5B:
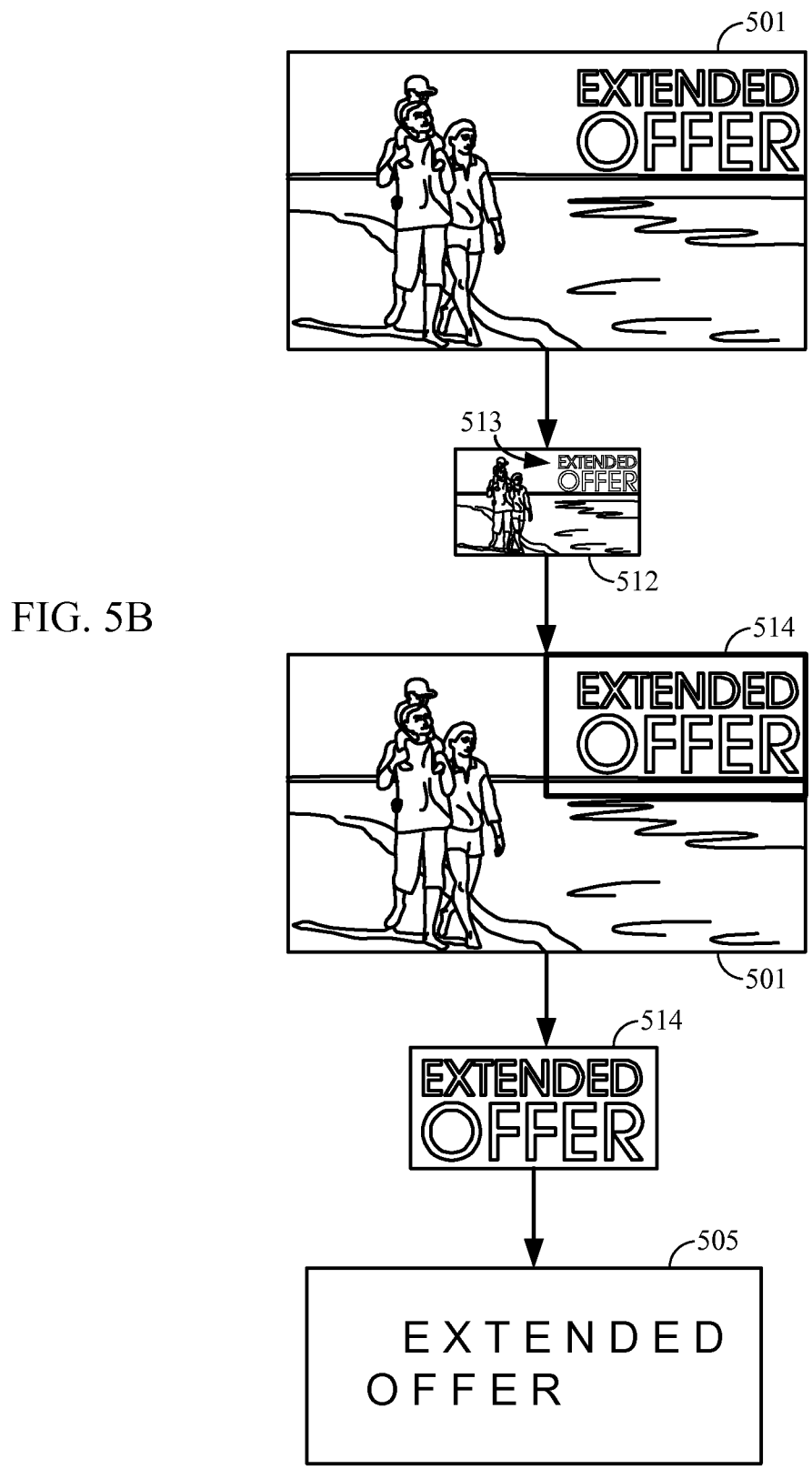
Figure 5C:
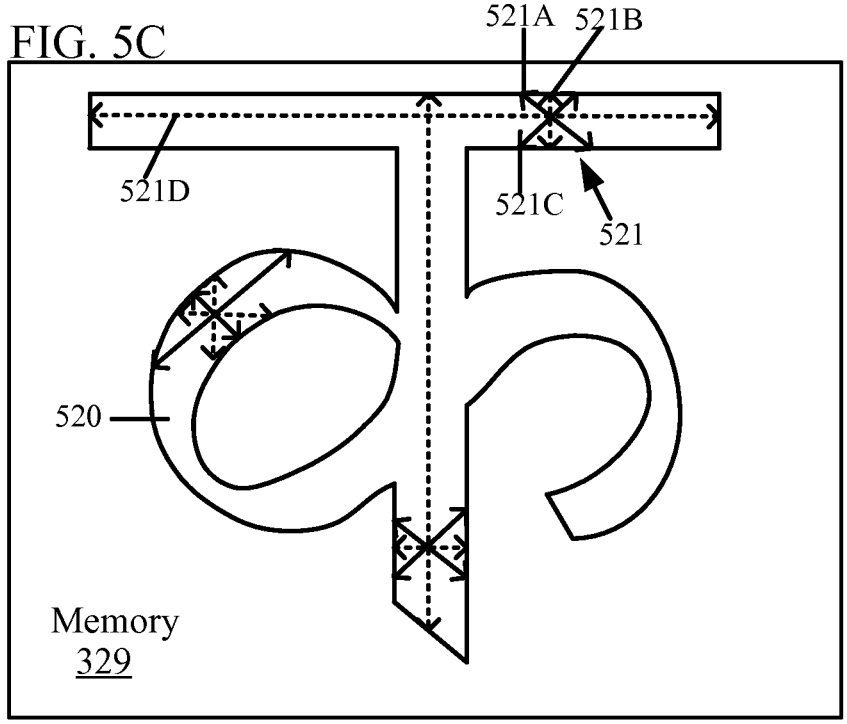
FIGS. 5C and 5D illustrate computation of stroke width that is used in some embodiments.

Certain embodiments perform coarse localization in act 212 to generate input (B) in the form of one or more image portions that are to be subject to MSER processing as shown in FIG. 5B. Specifically, an image 501 is subsampled (or downsampled) in act 211C (FIG. 2C) to obtain a subsampled image 512 that is smaller in dimensions than image 501. In some embodiments, processor 404 is configured in software to subsample the image to obtain a subsampled version, in any manner that would be readily apparent in view of this description. For example, if the subsampling factor is 2, then subsampled image 512 is ¼ the size of image 501. Next, subsampled image 512 is itself subject to MSER processing in act 212C (FIG. 2C) to identify therein MSER regions (also called "subsampled MSER regions"). Next, in act 212C, each subsampled MSER region is subject to one or more predetermined tests. For example, stroke width may be computed (as shown in FIG. 5C) for each subsampled MSER region and compared to a threshold (a minimum stroke width, above which the region is treated as a candidate for OCR). In this manner, one or more subsampled MSER regions 513 that pass the test(s) (e.g. to be selected for MSER processing in a normal manner) are identified in act 212C (FIG. 2C). This is followed by cropping from the image 501 a rectangular portion 514 defined by a smallest rectangle (also called "bounding box") that fits the subsampled MSER regions 513 that pass the test(s), and this rectangular portion 514 of the image 501 is then marked in one or more memories 214 (FIG. 2C) as input to MSER processing.

Figure 5D:
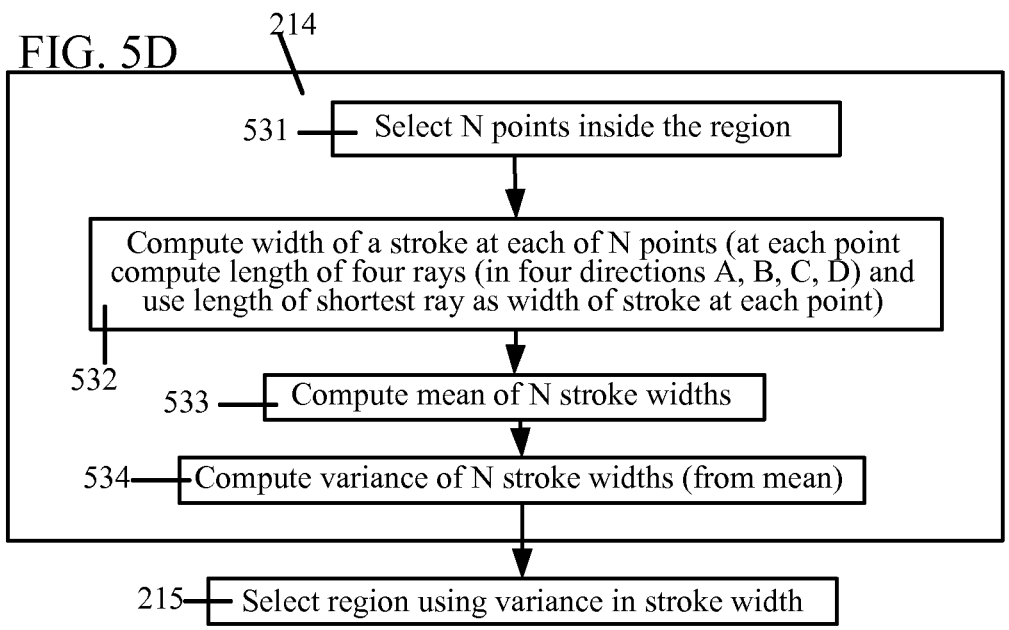

FIG. 5C illustrates determination of stroke width (e.g. for use in a test to select a segment for MSER processing), by selecting a fixed number of points (e.g. 3 points) within a subsampled MSER region 520 and computing a dimension of the subsampled MSER region 520 in each of a predetermined number of directions (e.g. 4 directions), followed by selecting the smallest dimension computed (e.g. among the 4 directions) as the stroke width. The specific manner in which stroke width in some embodiments is illustrated by the method of FIG. 5D. Specifically, in some illustrative embodiments, processor(s) 404 performs acts 531-534 (FIG. 5D) to compute stroke width as follows. In act 531, mobile device 401 selects N points inside a subsampled MSER region 520 (FIG. 5A), such as the point 521. Next, in act 532 mobile device 401 computes width of a stroke at each of the N points. For example, at point 521, processor 404 computes the length of four rays 521A, 521B, 521C, and 521D and then uses the length of ray 521B (which is selected for being shortest) as width of the stroke at point 521. Then, in act 533, mobile device 401 computes the mean of N such stroke widths for the subsampled MSER region 520. Finally, in act 534, mobile device 401 computes standard deviation and/or variance of the N stroke widths (from the mean). Then mobile device 401 checks if the variance is less than a predetermined threshold, and if so the region is selected and marked in one or more memories 214 (FIG. 2C), as input to MSER processing, as noted above.

Mobile device 401 of some embodiments that performs the method shown in FIG. 2 is a mobile device, such as a smartphone that includes a camera 405 (FIG. 6) of the type described above to generate an image of a real world scene that is then processed to identify any predetermined symbol therein. Mobile device 401 may further include sensors 406 that provide information on movement of mobile device 401, such as an accelerometer, a gyroscope, a compass, or the like. Mobile device 401 may use an accelerometer and a compass and/or other sensors to sense tilting and/or turning in the normal manner, to assist processor 404 in determining the orientation and position of a predetermined symbol in an image captured in mobile device 401. Instead of or in addition to sensors 406, mobile device 401 may use images from a camera 405 to assist processor 404 in determining the orientation and position of mobile device 401 relative to the predetermined symbol being imaged. Also, mobile device 401 may additionally include a graphics engine 1004 and an image processor 1005 that are used in the normal manner.

Mobile device 401 may optionally include MSER input generator 351 and MSER processor 352 (e.g. implemented by one or more processor(s) 404 executing software in blocks 329) to identify presence of predetermined symbols in blocks received as input by OCR software 1014 (when executed by processor 404).

In addition to memory 329, mobile device 401 may include one or more other types of memory such as flash memory (or SD card) 1008 and/or a hard disk and/or an optical disk (also called "secondary memory") to store data and/or software for loading into memory 329 (also called "main memory") and/or for use by processor(s) 404. Mobile device 401 may further include a wireless transmitter and receiver in transceiver 1010 and/or any other communication interfaces 1009. It should be understood that mobile device 401 may be any portable electronic device such as a cellular or other wireless communication device, personal communication system (PCS) device, personal navigation device (PND), Personal Information Manager (PIM), Personal Digital Assistant (PDA), laptop, camera, smartphone, tablet (such as iPad available from Apple Inc) or other suitable mobile platform that is capable of creating an augmented reality (AR) environment.

A mobile device 401 of the type described above may include other position determination methods such as object recognition using "computer vision" techniques. The mobile device 401 may also include means for remotely controlling a real world object which may be a toy, in response to user input on mobile device 401 e.g. by use of transmitter in transceiver 1010, which may be an IR or RF transmitter or a wireless a transmitter enabled to transmit one or more signals over one or more types of wireless communication networks such as the Internet, WiFi, cellular wireless network or other network. The mobile device 401 may further include, in a user interface, a microphone and a speaker (not labeled). Of course, mobile device 401 may include other elements unrelated to the present disclosure, such as a read-only-memory 1007 which may be used to store firmware for use by processor 404.

Also, depending on the embodiment, a mobile device 401 may perform reference free tracking and/or reference based tracking using a local detector in mobile device 401 to detect predetermined symbols in images, in implementations that execute the OCR software 1014 to identify, e.g. characters of text in an image. The above-described identification of blocks for use by OCR software 1014 may be performed in software (executed by one or more processors or processor cores) or in hardware or in firmware, or in any combination thereof.

In some embodiments of mobile device 401, the above-described MSER input generator 351 and MSER processor 352 are included in OCR software 1014 that is implemented by a processor 404 executing the software 320 in memory 329 of mobile device 401, although in other embodiments any one or more of MSER input generator 351 and MSER processor 352 are implemented in any combination of hardware circuitry and/or firmware and/or software in mobile device 401. Hence, depending on the embodiment, various functions of the type described herein of OCR software may be implemented in software (executed by one or more processors or processor cores) or in dedicated hardware circuitry or in firmware, or in any combination thereof.

Although some embodiments of one or more processor(s) 404 perform MSER processing after performing either act 212A (FIG. 2A) or act 212B (FIG. 2B), other embodiments perform both acts 212A and 212B, as illustrated in FIG. 7. Specifically, after above-described act 201 (see FIG. 2A or 2B), the input image is divided up by processor(s) 404 into rectangular portions (which may or may not overlap one another) in an act 711 (FIG. 7), followed by selection of one of the rectangular portions in act 712. Subsequently, in an act 713, similar to above-described act 212A, an attribute of a histogram of pixel intensities in the selected rectangular portion is computed by processor(s) 404. Then, using a lookup table 1022 (FIG. 6) of thresholds (also called "first table"), this attribute (also called "first attribute") is used by processor(s) 404, to determine (in act 714), whether an MSER method is to be performed on the selected rectangular portion and if not, control returns to act 712. As noted above, processor(s) 404 may compute a ratio of height to width of an area of the histogram, and check if the ratio is greater than e.g. 2 and if so then the MSER method is performed.

If the decision in act 714 is that the MSER method is to be performed, then act 715 is performed by processor(s) 404. In act 715, another attribute of the histogram of pixel intensities in the selected rectangular portion is computed by processor(s) 404. Then, in an act similar to above-described act 212B, another lookup table 1023 of thresholds (also called "second table") is used with this attribute (also called "second attribute") by processor(s) 404 to identify (in act 715) one or more parameters that are input to an MSER method (such as Δ and Max Variation). Thereafter, in act 716, the MSER method is performed, e.g. as described above in reference to act 215. Subsequently, in act 717, the one or more processor(s) 404 check whether all rectangular portions have been processed and if not return to act 712 to select another rectangular portion for processing. When all rectangular portions have been processed, the one or more processor(s) 404 go from act 717 to act 718 to analyze the MSER regions to identify one or more symbols in the image followed by storing in one or more memories, the symbols identified in the image.

Accordingly, depending on the embodiment, any one or more of MSER input generator 351 and MSER processor 352 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

Hence, methodologies described herein may be implemented by various means depending upon the application. For example, these methodologies may be implemented in firmware 1013 (FIG. 6) or software 320, or hardware 1012 or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

Any non-transitory machine-readable medium tangibly embodying software instructions (also called "computer instructions") may be used in implementing the methodologies described herein. For example, software 320 (FIG. 6) may include program codes stored in memory 329 and executed by processor 404 to implement, for example, MSER input generator 351, or MSER processor 352, or both, or part of each. Memory 329 may be implemented within or external to the processor 404 depending on the embodiment. If implemented in firmware and/or software, the logic of MSER input generator 351 and/or MSER processor 352 may be stored as one or more instructions or code on a non-transitory computer-readable storage medium. Examples include one or more non-transitory computer-readable storage media encoded with a data structure (such as lookup table 1022 and/or lookup table 1023) and one or more non-transitory computer-readable storage media encoded with a computer program configured to implement the logic of MSER input generator 351 and/or MSER processor 352.

Non-transitory computer-readable media includes physical computer storage media. A non-transitory storage medium may be any available non-transitory medium that can be accessed by a computer. By way of example, and not limitation, such non-transitory computer-readable media can comprise RAM, ROM, Flash Memory, EEPROM, CD-ROM or other optical disk storage, magnetic disk storage or other magnetic storage devices, or any other non-transitory medium that can be used to store program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Although certain examples are illustrated in connection with specific embodiments for instructional purposes, the described embodiments is not limited thereto. Hence, although item 401 shown in FIGS. 2A-2C and 6 of some embodiments is a mobile device, in other embodiments item 401 is implemented by use of form factors that are different, e.g. in certain other embodiments item 401 is a mobile platform (such as a tablet, e.g. iPad available from Apple, Inc.) while in still other embodiments item 401 is any electronic device or system. Illustrative embodiments of such an electronic device or system may include multiple physical parts that intercommunicate wirelessly, such as a processor and a memory that are portions of a stationary computer, such as a lap-top computer, a desk-top computer, or a server computer 1015 communicating over one or more wireless link(s), with sensors and user input circuitry enclosed in a housing that is small enough to be held in a hand.

Depending on a specific symbol recognized in a handheld camera captured image, a user can receive different types of feedback depending on the embodiment. Additionally haptic feedback (e.g. by vibration of mobile device 401) is provided by triggering haptic feedback circuitry 1018 (FIG. 6) in some embodiments, to provide feedback to the user when text is recognized in an image. Instead of the just-described haptic feedback, audio feedback may be provided via a speaker in mobile device 401, in other embodiments.

Accordingly, in some embodiments, one or more processor(s) 404 are programmed with software 320 in an apparatus to operate as means for receiving an image of a scene of real world, means for computing an attribute based on pixel intensities in the image, means for using the attribute to identify at least one input to be used in processing the image to identify at least one maximally stable extremal region therein, means for performing said processing to identify said at least one maximally stable extremal region based on said at least one input, and means for storing in one or more memories, the at least one maximally stable extremal region identified by said processing. In some of the just-described embodiments one or more processor(s) 404 are programmed with software 320 to operate as means for subsampling the image to obtain a subsampled version, means for identifying an additional maximally stable extremal region (also called "second maximally stable extremal region") in the subsampled version and means for using a stroke width of the additional maximally stable extremal region to identify said portion to be subject to said processing.

Various adaptations and modifications may be made without departing from the scope of the described embodiments. Therefore, the spirit and scope of the appended claims should not be limited to the foregoing description. It is to be understood that several other aspects of the described embodiments will become readily apparent to those skilled in the art from the description herein, wherein it is shown and described various aspects by way of illustration. The drawings and detailed description are to be regarded as illustrative in nature. Numerous modifications and adaptations of the described embodiments are encompassed by the attached claims.

The invention claimed is:

1. A method to identify regions in images, the method comprising:
  receiving an image of a scene of real world;
  with one or more processors, computing an attribute based on pixel intensities in the image;
  with the one or more processors, using the attribute with a lookup table or a predetermined test, to identify at least one input to be used in processing the image to identify at least one maximally stable extremal region therein;
  wherein the at least one input is one of (A) a parameter Δ or Max Variation or both obtained by use of at least said attribute from the lookup table and used in said processing or (B) a portion of the image obtained prior to said processing by applying the predetermined test to a subsampled region in the image, the portion to be subject to said processing, or both (A) and (B);
  with the one or more processors, performing said processing to identify said at least one maximally stable extremal region based on said at least one input;
  wherein said processing comprises at least comparing a difference in intensities of a pair of pixels in the image to a predetermined limit, adding to a list, a pair of coordinates of a pixel in said pair of pixels, in response to finding said predetermined limit is exceeded, and repeating said comparing and said adding; and
  with the one or more processors, storing in one or more memories, the list as a representation of the at least one maximally stable extremal region identified by said processing.

2. The method of claim 1 wherein:
  the attribute is computed from a histogram of said pixel intensities as a function of number of pixels at each intensity in said pixel intensities.

3. The method of claim 2 wherein:
  the attribute is based on a plurality of bins in said histogram with corresponding counts of pixels above a threshold.

4. The method of claim 3 wherein:
  the threshold is a fraction of a maximum count among the plurality of bins in said histogram.

5. The method of claim 3 wherein:
  the attribute is an area of the histogram above a mean of counts of pixels in the plurality of bins of said histogram.

6. The method of claim 1 wherein:
the attribute is a variance of said pixel intensities.

7. The method of claim 1 wherein:
the attribute is used with a look-up table to identify the parameter.

8. The method of claim 1 wherein:
the attribute is used in checking whether the portion satisfies the predetermined test.

9. The method of claim 8 wherein when the portion is found to satisfy the predetermined test:
prior to said processing with the one or more processors, cropping from the image a rectangular region defined by a smallest rectangle that fits the portion.

10. The method of claim 1 wherein said at least one maximally stable extremal region is hereinafter first maximally stable extremal region, the method further comprising:
subsampling the image to obtain a subsampled version;
processing the subsampled version to identify a second maximally stable extremal region in the subsampled version of said image; and
using a smallest dimension of the second maximally stable extremal region to identify said portion to be subject to said processing.

11. A mobile device to identify regions in images, the mobile device comprising:
one or more memories comprising a plurality of portions of an image of a scene of real world;
one or more processors configured to:
compute an attribute based on pixel intensities in the image;
use the attribute, with a lookup table or a predetermined test, to identify at least one input to be used in processing the image to identify at least one maximally stable extremal region therein;
wherein the at least one input is one of (A) a parameter Δ or Max Variation or both obtained from the lookup table and used in said processing or (B) a portion of the image to be subject to said processing, the portion being obtained prior to said processing by applying the predetermined test to a subsampled region in the image or both (A) and (B);
perform said processing to identify said at least one maximally stable extremal region based on said at least one input;
wherein said processing comprises at least comparing a difference in intensities of a pair of pixels in the image to a predetermined limit, adding to a list, a pair of coordinates of a pixel in said pair of pixels, in response to finding said predetermined limit is exceeded, and repeating said comparing and said adding; and
store in said one or more memories, the list as a representation of the at least one maximally stable extremal region identified by said processing.

12. The mobile device of claim 11 wherein:
the attribute is computed from a histogram of said pixel intensities as a function of number of pixels at each intensity in said pixel intensities.

13. The mobile device of claim 12 wherein:
the attribute is based on a plurality of bins in said histogram with corresponding counts of pixels above a threshold.

14. The mobile device of claim 13 wherein:
the threshold is a fraction of a maximum count among the plurality of bins in said histogram.

15. The mobile device of claim 13 wherein:
the attribute is an area of the histogram above a mean of counts of pixels in the plurality of bins of said histogram.

16. The mobile device of claim 11 wherein:
the attribute is a variance of said pixel intensities.

17. The mobile device of claim 11 wherein:
the one or more processors are further configured to use the attribute with a look-up table to identify the parameter.

18. The mobile device of claim 11 wherein:
the one or more processors are further configured to use the attribute in checking whether the portion satisfies the predetermined test.

19. The mobile device of claim 18 wherein the one or more processors are further configured to respond to finding the portion to satisfy the predetermined test by:
prior to said processing, cropping from the image a rectangular region defined by a smallest rectangle that fits the portion.

20. The mobile device of claim 18 wherein said at least one maximally stable extremal region is hereinafter first maximally stable extremal region, and the one or more processors are further configured to:
subsample the image to obtain a subsampled version;
to identify a second maximally stable extremal region in the subsampled version of the image; and
use a smallest dimension of the second maximally stable extremal region to identify said portion to be subject to said processing.

21. One or more non-transitory computer-readable media comprising a plurality of instructions to one or more processors to perform a method, the plurality of instructions comprising:
first instructions to receive an image of a scene of real world;
second instructions to compute an attribute based on pixel intensities in the image;
third instructions to use the attribute, with a lookup table or a predetermined test, to identify at least one input to be used in processing the image to identify at least one maximally stable extremal region therein;
wherein the at least one input is one of (A) a parameter Δ or Max Variation or both obtained from the lookup table and used in said processing or (B) a portion of the image to be subject to said processing, the portion being obtained prior to said processing by applying the predetermined test to a subsampled region in the image or both (A) and (B);
fourth instructions to perform said processing to identify said at least one maximally stable extremal region based on said at least one input;
wherein said processing comprises at least comparing a difference in intensities of a pair of pixels in the image to a predetermined limit, adding to a list, a pair of coordinates of a pixel in said pair of pixels, in response to finding said predetermined limit is exceeded, and repeating said comparing and said adding; and
fifth instructions to store in one or more memories, the list as a representation of the at least one maximally stable extremal region identified by said processing.

22. The one or more non-transitory computer-readable media of claim 21 wherein:
the attribute is computed from a histogram of said pixel intensities as a function of number of pixels at each intensity in said pixel intensities.

23. The one or more non-transitory computer-readable media of claim 22 wherein:
the attribute is based on a plurality of bins in said histogram with corresponding counts of pixels above a threshold.

24. The one or more non-transitory computer-readable media of claim 23 wherein:
the threshold is a fraction of a maximum count among the plurality of bins in said histogram.

25. The one or more non-transitory computer-readable media of claim 23 wherein:
the attribute is an area of the histogram above a mean of counts of pixels in the plurality of bins of said histogram.

26. The one or more non-transitory computer-readable media of claim 21 wherein:
the attribute is a variance of said pixel intensities.

27. The one or more non-transitory computer-readable media of claim 21 further comprising:
sixth instructions to use the attribute with a look-up table to identify the parameter.

28. The one or more non-transitory computer-readable media of claim 21 further comprising:
sixth instructions to use the attribute in checking whether the portion satisfies the predetermined test.

29. The one or more non-transitory computer-readable media of claim 28 further comprising:
prior to execution of the fourth instructions, seventh instructions to crop from the image a rectangular region defined by a smallest rectangle that fits the portion.

30. The one or more non-transitory computer-readable media of claim 21 wherein said at least one maximally stable extremal region is hereinafter first maximally stable extremal region, the one or more non-transitory computer-readable media further comprising:
sixth instructions to subsample the image to obtain a subsampled version;
seventh instructions to process the subsampled version to identify a second maximally stable extremal region in the subsampled version of the image; and
eighth instructions to use a smallest dimension of the second maximally stable extremal region to identify said portion to be subject to said processing.

31. An apparatus to identify regions in images, the apparatus comprising:
means for receiving an image of a scene of real world;
means for computing an attribute based on pixel intensities in the image;
means for using the attribute, with a lookup table or a predetermined test, to identify at least one input to be used in processing the image to identify at least one maximally stable extremal region therein;
wherein the at least one input is one of (A) a parameter $\Delta$ or Max Variation or both obtained from the lookup table and used in said processing or (B) a portion of the image to be subject to said processing, the portion being obtained prior to said processing by applying the predetermined test to a subsampled region in the image or both (A) and (B);
means for performing said processing to identify said at least one maximally stable extremal region based on said at least one input;
wherein said processing comprises at least comparing a difference in intensities of a pair of pixels in the image to a predetermined limit, adding to a list, a pair of coordinates of a pixel in said pair of pixels, in response to finding said predetermined limit is exceeded, and repeating said comparing and said adding; and
means for storing in one or more memories, the list as a representation of the at least one maximally stable extremal region identified by said processing.

32. The apparatus of claim 31 wherein:
the attribute is computed from a histogram of said pixel intensities as a function of number of pixels at each intensity in said pixel intensities.

33. The apparatus of claim 31 wherein:
the attribute is used with a look-up table to identify the parameter.

34. The apparatus of claim 31 further comprising:
means for subsampling the image to obtain a subsampled version;
means for identifying an additional maximally stable extremal region in the subsampled version of the image; and
means for using a smallest dimension of the additional maximally stable extremal region to identify said portion to be subject to said processing.

* * * * *